(12) United States Patent
Suzuki

(10) Patent No.: US 10,079,568 B2
(45) Date of Patent: Sep. 18, 2018

(54) ROTARY ELECTRIC MACHINE CONTROL DEVICE AND ELECTRIC POWER STEERING DEVICE INCLUDING THE SAME

(71) Applicant: DENSO CORPORATION, Kariya, Aichi-pref. (JP)

(72) Inventor: Takashi Suzuki, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 15/273,407

(22) Filed: Sep. 22, 2016

(65) Prior Publication Data

US 2017/0104437 A1    Apr. 13, 2017

(30) Foreign Application Priority Data

Oct. 13, 2015 (JP) ................. 2015-201958

(51) Int. Cl.
| | |
|---|---|
| *H02P 29/028* | (2016.01) |
| *H02K 1/12* | (2006.01) |
| *B62D 5/04* | (2006.01) |
| *H02K 1/27* | (2006.01) |
| *H02K 3/28* | (2006.01) |
| *H02K 21/14* | (2006.01) |
| *H02P 29/032* | (2016.01) |
| *H02P 25/22* | (2006.01) |
| *H02P 29/024* | (2016.01) |

(52) U.S. Cl.
CPC .......... *H02P 29/028* (2013.01); *B62D 5/0475* (2013.01); *B62D 5/0481* (2013.01); *H02K 1/12* (2013.01); *H02K 1/2706* (2013.01); *H02K 3/28* (2013.01); *H02K 21/14* (2013.01); *H02P 25/22* (2013.01); *H02P 29/024* (2013.01); *H02P 29/032* (2016.02)

(58) Field of Classification Search
CPC .... H02P 29/028; H02P 29/032; B62D 5/0475
USPC ........................................... 318/137
See application file for complete search history.

(56) References Cited

U.S. PATENT DOCUMENTS

| | | | | |
|---|---|---|---|---|
| 2004/0223347 | A1* | 11/2004 | Kobayashi ........... | H02J 9/062 363/37 |
| 2011/0074333 | A1* | 3/2011 | Suzuki ................ | B62D 5/0403 318/724 |
| 2012/0032625 | A1* | 2/2012 | Suzuki ................ | B62D 5/0487 318/490 |

FOREIGN PATENT DOCUMENTS

JP    2009-268332 A    4/2008

* cited by examiner

*Primary Examiner* — Eduardo Colon Santana
*Assistant Examiner* — Devon Joseph
(74) *Attorney, Agent, or Firm* — Knobbe, Martens, Olson & Bear, LLP

(57) ABSTRACT

A rotary electric machine control device for a rotary electric machine having winding sets with coils includes: an inverter for each winding set; a power source relay for each inverter; a terminal voltage detector detecting a terminal voltage of each coil; and a controller including an inverter controller, a relay controller and an abnormality determination unit. Each winding set and a corresponding inverter provides a system. When the rotary electric machine is driven using a normal system: the relay controller controls the power source relay to cut off power supply from a power source to the inverter in an abnormal system; the abnormality determination unit specifies a short-circuited location based on the terminal voltage in the abnormal system; and the inverter controller corrects a command value related to control of the inverter in the normal system according to a specified short-circuited location.

8 Claims, 14 Drawing Sheets

US 10,079,568 B2

ROTARY ELECTRIC MACHINE CONTROL DEVICE AND ELECTRIC POWER STEERING DEVICE INCLUDING THE SAME

CROSS REFERENCE TO RELATED APPLICATION

This application is based on Japanese Patent Application No. 2015-201958 filed on Oct. 13, 2015, the disclosure of which is incorporated herein by reference.

TECHNICAL FIELD

The present disclosure relates to a rotary electric machine control device and an electric power steering device including the same

BACKGROUND

There has been known a control device for a multiple-phase rotary machine. For example, in Patent Literature 1, a switching element in a system without failure is controlled so as to cancel brake torque generated in a system with failure.

In Patent Literature 1, there is specified a switching element with on-failure in a state where a control part has stopped pulse width modulation (PWM) control, that is, in a state where a motor has been stopped. However, in Patent Literature 1, it is not possible to specify the switching element with on-failure in a state where the motor is rotating.

Patent Literature 1: Japanese Patent No. 4831503

SUMMARY

It is an object of the present disclosure to provide a rotary electric machine control device capable of specifying a short-circuited location, with a rotary electric machine in a rotating state, and an electric power steering device including the rotary electric machine control device.

According to a first aspect of the present disclosure, a rotary electric machine control device for controlling a rotary electric machine that has a plurality of winding sets, each of which includes a plurality of coils corresponding to a plurality of phases, respectively, includes: an inverter that is arranged for each winding set and converts power of the rotary electric machine; a power source relay that is arranged for each inverter and cuts off power supply from a power source to the inverter; a terminal voltage detector that detects a terminal voltage of each coil; and a controller that includes an inverter controller for controlling each inverter, a relay controller for controlling each power source relay, and an abnormality determination unit for determining abnormality of each inverter and each winding set. A combination of each winding set and a corresponding inverter is defined as a system. One of the systems where abnormality occurs is defined as an abnormal system. Another one of the systems that is normal is defined as a normal system. When the rotary electric machine is driven using the normal system: the relay controller controls the power source relay so as to cut off power supply from the power source to the inverter in the abnormal system; the abnormality determination unit specifies a short-circuited location based on the terminal voltage in the abnormal system; and the inverter controller corrects a command value related to control of the inverter in the normal system according to a specified short-circuited location.

In the above rotary electric machine control device, in a state where the power supply from the power source to the inverter is cut off by the power source relay part in the abnormal system, a short-circuited location is determined based on a terminal voltage generated by counter electromotive force of the rotary electric machine. Hence, it is possible to appropriately specify the short-circuited location, with the rotary electric machine in a rotating state. Further, it is possible to reduce torque ripple by correcting a command value in accordance with the short-circuited location.

According to a second aspect of the present disclosure, an electric power steering device includes: the rotary electric machine control device according to the first aspect of the present disclosure; and the rotary electric machine that outputs auxiliary torque for assisting a steering operation of a driver.

In the above electric power steering device, in a state where the power supply from the power source to the inverter is cut off by the power source relay part in the abnormal system, a short-circuited location is determined based on a terminal voltage generated by counter electromotive force of the rotary electric machine. Hence, it is possible to appropriately specify the short-circuited location, with the rotary electric machine in a rotating state. Further, it is possible to reduce torque ripple by correcting a command value in accordance with the short-circuited location.

BRIEF DESCRIPTION OF THE DRAWINGS

The above and other objects, features and advantages of the present disclosure will become more apparent from the following detailed description made with reference to the accompanying drawings. In the drawings:

FIG. 2A is a schematic perspective view, and FIG. 2B is an explanatory view for explaining a phase sequence;

DETAILED DESCRIPTION

Hereinafter, a rotary electric machine control device according to the present disclosure and an electric power steering device including the same will be described based on the drawings. In a plurality of embodiments below, substantially the same configurations will be denoted with the same reference sign, and the repeated description thereof will be omitted.

First Embodiment

FIGS. 1 to 11B show a first embodiment of the present disclosure.

Figure 1:
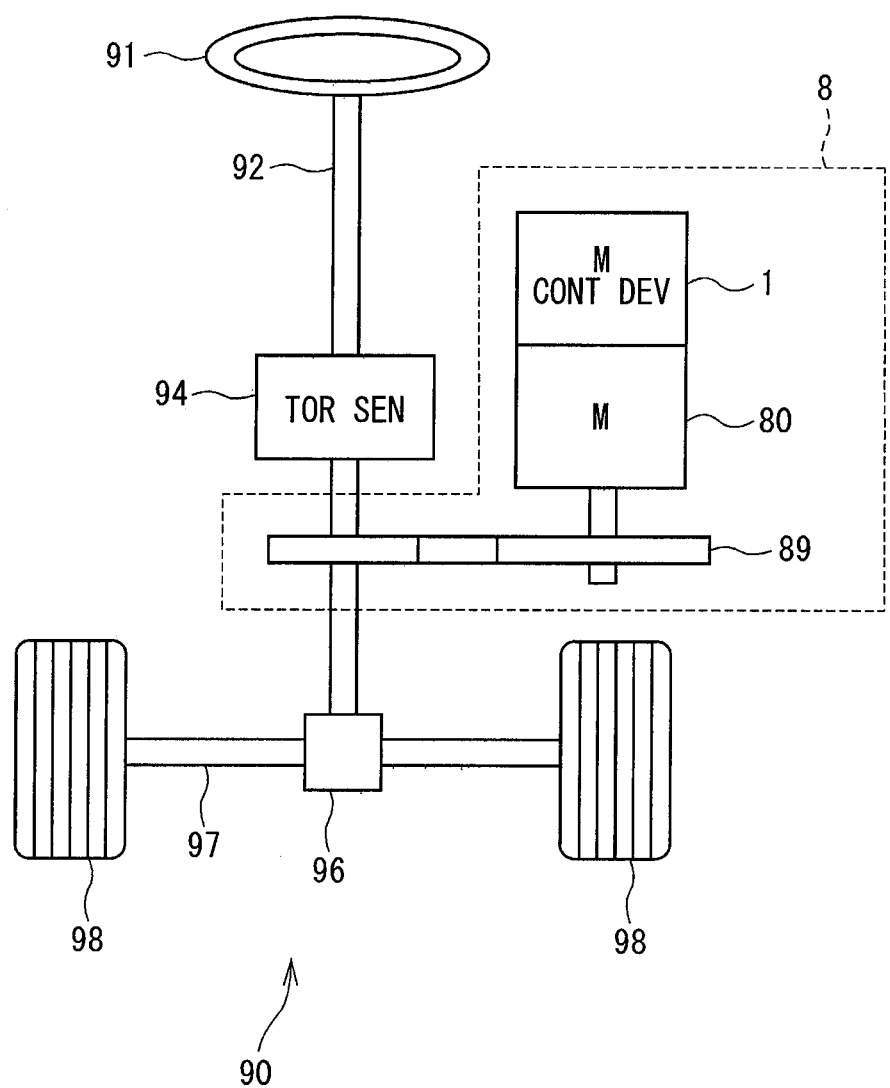
FIG. 1 is a schematic configuration diagram showing a steering system according to a first embodiment of the present disclosure.

As shown in FIG. 1, a motor control device 1 as a rotary electric machine control device is applied to an electric power steering device 8 that assists steering operation by a driver, in conjunction with a motor 80 as a rotary electric machine.

FIG. 1 shows a configuration of a steering system 90 provided with the electric power steering device 8. The steering system 90 includes a steering wheel 91 being a steering member, a steering shaft 92, a pinion gear 96, a rack shaft 97, wheels 98, the electric power steering device 8, and the like.

The steering wheel 91 is connected with the steering shaft 92. The steering shaft 92 is provided with a torque sensor 94 for detecting steering torque that is inputted by the driver operating the steering wheel 91. The pinion gear 96 is provided at the tip of the steering shaft 92. The pinion gear 96 is meshed with the rack shaft 97. A pair of wheels 98 is coupled to both ends of the rack shaft 97 through tie rods or the like.

When the driver rotates the steering wheel 91, the steering shaft 92 connected to the steering wheel 91 rotates. The rotational motion of the steering shaft 92 is converted to linear motion of the rack shaft 97 by the pinion gear 96. The pair of wheels 98 is steered at an angle in accordance with a displacement amount of the rack shaft 97.

The electric power steering device 8 includes the motor 80, a reduction gear 89 that reduces the rotation of the motor 80 and transmits the rotation to the steering shaft 92 or the rack shaft 97, the motor control device 1, and the like. That is, the electric power steering device 8 of the present embodiment is of a so-called "column assist type", but may be of a so-called "rack assist type" that transmits the rotation of the motor 80 to the rack shaft 97.

The motor 80 outputs assistance torque for assisting steering of the steering wheel 91 by the driver, and is driven by supply of power from a battery 5 (see FIGS. 2A and 2B) as a power source, to rotate the reduction gear 89 forward and backward.

As shown in FIGS. 2A to 4, the motor 80 is a three-phase blushless motor, and includes a rotor 83, a stator 85, and two winding sets 810, 820.

Figure 4:
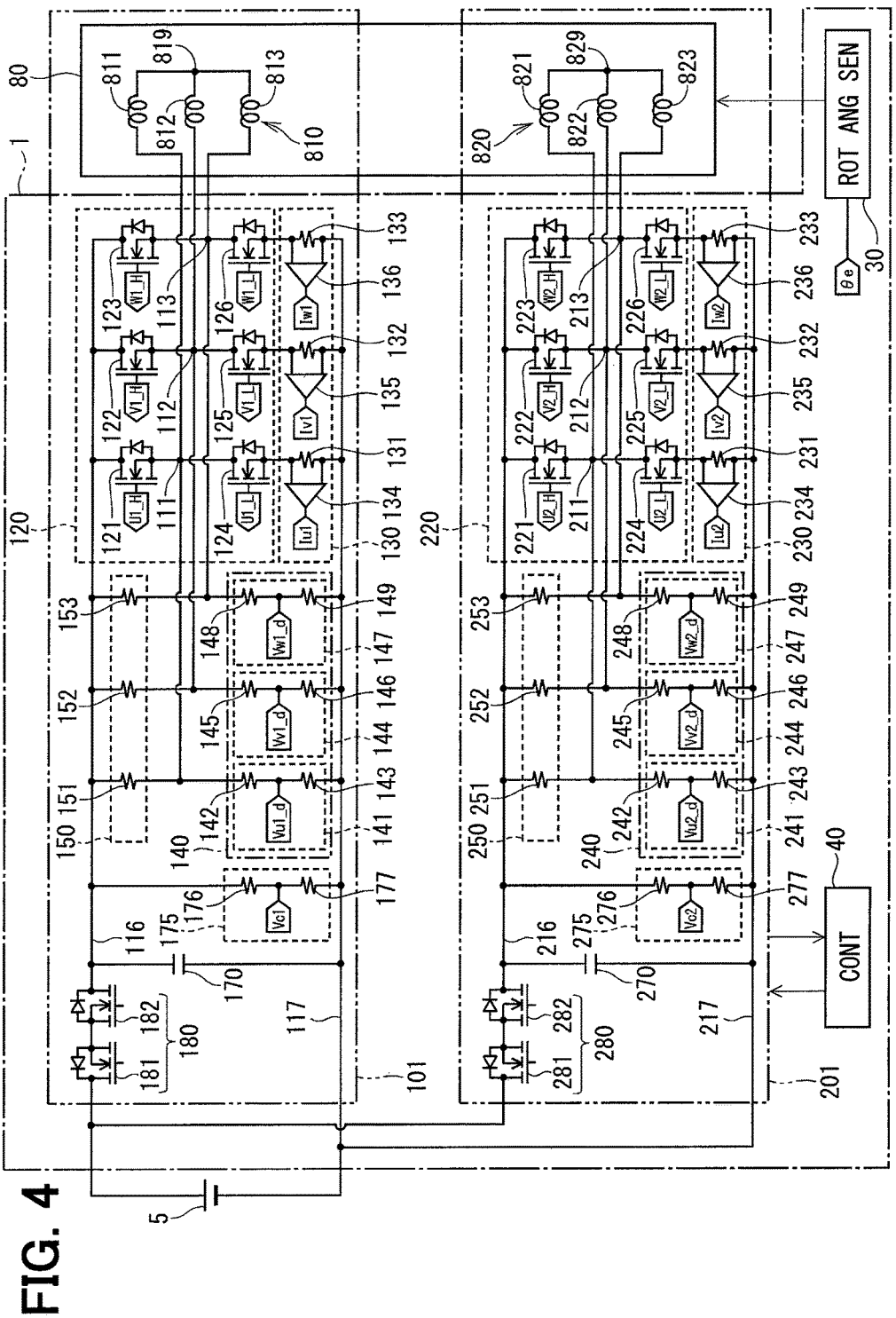
FIG. 4 is a circuit diagram for explaining a motor control device according to the first embodiment of the present disclosure.

As shown in FIG. 4, the first winding set 810 includes a U1 coil 811, a V1 coil 812, and a W1 coil 813. One ends of the coils 811, 812, 813 are connected to a first inverter 120, and the other ends thereof are connected by a connecting part 819. Hereinafter, the one end of the U1 coil 811 is referred to as a U1 terminal 111, the one end of the V1 coil 812 is as a V1 terminal 112, and the one end of the W1 coil 813 is as a W1 terminal 113.

The second winding set 820 includes a U2 coil 821, a V2 coil 822 and a W2 coil 823. One ends of the coils 821, 822, 823 are connected to a second inverter 220, and the other ends thereof are connected by a connecting part 829. Hereinafter, the one end of the U2 coil 821 is referred to as a U2 terminal 211, the one end of the V1 coil 812 is as a V2 terminal 212, and the one end of the W2 coil 823 is as a W2 terminal 213.

Figure 2A:
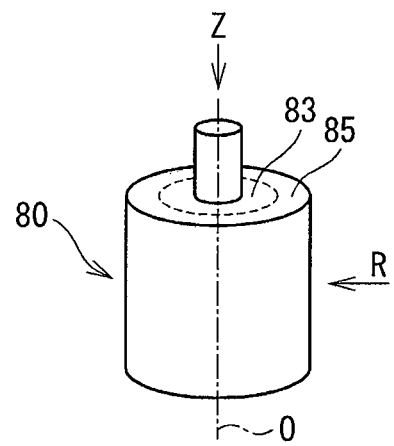
FIGS. 2A and 2B are explanatory views for explaining a motor according to the first embodiment of the present disclosure.
Figure 2B:
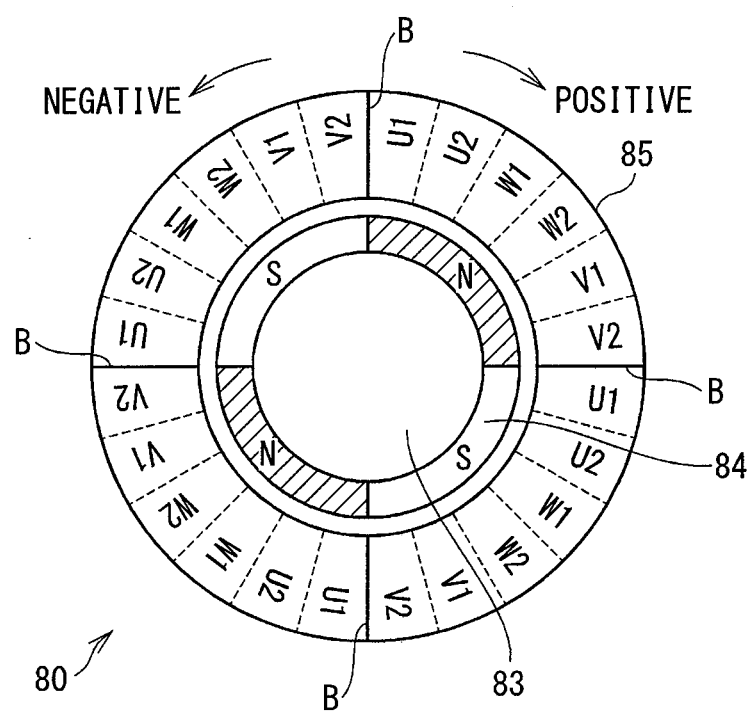

As shown in FIGS. 2A and 2B, the rotor 83 is disposed radially inside the stator 85, and provided to be relatively rotatable with respect to the stator 85 around a rotational axis O. A permanent magnet 84 with the number of poles of (2×m) is provided radially outside the rotor 83. Herein, "m" is a natural number, and equals 2 in the present embodiment. That is, the number of magnetic poles of the rotor 83 in the present embodiment is four, and one magnetic pole is disposed in a range of a mechanical angle of 90 degrees.

The coils 811 to 813, 821 to 823 are wound around the stator 85.

FIG. 2B is a schematic view of FIG. 2A seen from a Z-direction. In the present embodiment, a case where the rotor 83 rotates clockwise in FIG. 2B is referred to as positive rotation, and a case where it rotates counterclockwise is referred to as negative rotation.

The phase sequence of the coils 811 to 813, 821 to 823 will be described based on FIG. 2B. In FIG. 2B, the U1 coil 811 is denoted with "U1", the V1 coil 812 with "V1", the W1 coil 813 with "W1", the U2 coil 821 with "U2", the V2 coil 822 with "V2", and the W2 coil 823 with "W2".

As shown in FIG. 2B, each of the winding sets 810, 820 corresponds to one magnetic pole, and the U1 coil 811, the U2 coil 821, the W1 coil 813, the W2 coil 823, the V1 coil 812, and the V2 coil 822 are arrayed in this order each at a mechanical angle of 15 degrees from a reference line B.

Further, in the present embodiment, the U1 coil 811, the U2 coil 821, the V1 coil 812, and the V2 coil 822 are wound in a first direction, and the W1 coil 813 and the second coil 823 are wound in a second direction being opposite to the first direction.

Figure 3:
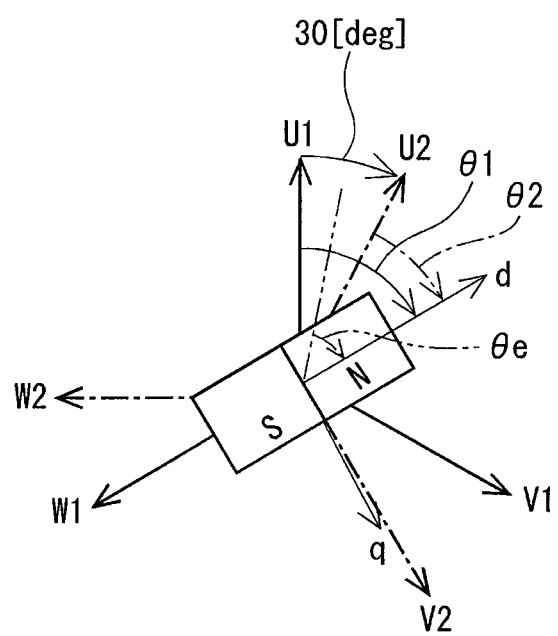
FIG. 3 is an explanatory diagram for explaining an electric angle according to the first embodiment of the present disclosure.

A phase sequence in terms of the electric angle is as shown in FIG. 3. An angle formed by a U-phase of a first system 101 and a d-axis, described later, is referred to as a first electric angle θ1, and an angle formed by a U-phase of a second system 201 and the d-axis is referred to as a second electric angle θ2. Formula (1-1) shows the relation between the first electric angle θ1 and the second electric angle θ2. Further, Formulas (1-2), (1-3) each show the relation between the first electric angle θ1 or the second electric angle θ2 and an electric angle θe described later. In this description, the unit of the electric angle is referred to as [deg].

$$\theta1-\theta2=30 \quad (1\text{-}1)$$

$$\theta1=\theta e+15 \quad (1\text{-}2)$$

$$\theta2=\theta e-15 \quad (1\text{-}3)$$

Further, Formulas (2-1), (2-2), (2-3) show induced voltages of the respective phases.

$$Eun=-\sin(\theta n) \quad (2\text{-}1)$$

$$Evn=-\sin(\theta n-120) \quad (2\text{-}2)$$

$$Ewn=-\sin(\theta n+120\} \quad (2\text{-}3)$$

In the respective formulas, "n" 1 or 2. When "n" equals 1, induced voltages Eu1, Ev1, Ew1 are induced voltages that are generated in the respective phases of the first winding set 810. When "n" equals 2, induced voltages Eu2, Ev2, Ew2 are induced voltages that are generated in the respective phases of the second winding set 820.

As shown in FIG. 4, the motor control device 1 controls the drive of the motor 80 by pulse width modulation control, or the like. The motor control device 1 includes inverters 120, 220, terminal voltage detection parts 140, 240, capacitors 170, 270, capacitor voltage detection parts 175, 275, a power source relay parts 180, 280, a rotation angle sensor 30, a control part 40, and the like. Note that in FIG. 4, a control line and the like are omitted as appropriate so as to avoid the complexity of the figure.

In the present embodiment, the first system 101 is made up of the first winding set 810, and the electronic components provided corresponding to the first winding set 810, such as the first inverter 120, each of the detection parts 130, 140, 175, the first capacitor 170, and the first power source relay part 180. Further, the second system 201 is made up of the second winding set 820, and the electronic components provided corresponding to the second winding set 820, such as the second inverter 220, each of the detection parts 230, 240, 275, the second capacitor 270, and the second power source relay part 280.

Hereinafter, as for a configuration with a three-digit numeral, when the hundreds place is "1", it means that the configuration is included in the first system 101, and when the hundreds place is "2", it means that the configuration is included in the second system 202. Further, when the last two digits of the composition included in the first system 101 are the same as those in the configuration included in the second system 201, it means that the configurations are similar.

Hereinafter, a description will be mainly given of the configuration and control in accordance with the first system 101, and a description of the configuration in accordance with the second system 201 will be omitted as appropriate. Note that a name of a configuration or a value in accordance with the second system 201 is obtained by change in an index "1" of the name in accordance with the first system 101 to "2", such as change from "first" to "second", or from "U1" to "U2".

The first inverter 120 is a three-phase inverter, and includes, a U1 upper arm element 121, a V1 upper arm element 122, a W1 upper arm element 123, a U1 lower arm element 124, a V1 lower arm element 125, and a W1 lower arm element 126.

Hereinafter, the elements 121 to 126, 221 to 226 are referred to as "SW elements".

The SW elements 121 to 126, 221 to 226 are all metal-oxide-semiconductor field-effect transistors (MOSFETs), but they may be insulated gate bipolar transistor (IGBTs), thyristors, or the like.

Drains of the upper arm elements 121, 122, 123 are connected to a first positive-side bus 116. Sources of the upper arm elements 121, 122, 123 are connected to drains of the respective pairs of the lower arm elements 124, 125, 126. Sources of the lower arm elements 124, 125, 126 are connected to a first negative-side bus 117.

A connection point of the paired U-phase upper arm element 121 and lower arm element 124 is connected to the U1 terminal 111. A connection point of the paired V-phase upper arm element 122 and lower arm element 125 is connected to the V1 terminal 112. A connection point of the paired W-phase upper arm element 123 and lower arm element 126 is connected to the W1 terminal 113.

The first positive-side bus 116 is high potential-side wiring for connecting the high potential-sides of the upper arm elements 121 to 123 with a positive electrode of the battery 5, and is on the downstream side of the first relay part 180. The downstream side of the first relay part 180 is assumed to be the opposite side to the battery 5. The first negative-side bus 117 is low potential-side wiring for connecting the low potential-sides of the lower arm elements 124 to 126 with a negative electrode of the battery 5 or a ground.

The first current detection part 130 includes current sensors 131, 132, 133. The current sensors 131 to 133 are respectively provided between the first lower arm elements 124 to 126 and the first negative-side bus 117, and detect respective phase currents Iu1, Iv1, Iw1 electrically conducted to the respective phases of the first winding set 810. The current sensors 131 to 133 of the present embodiment are all shunt resistors. End-to-end voltages of the current sensors 131 to 133 are outputted to the control part 40 as detection values in accordance with the respective phase currents Iu1, Iv1, Iw1 via operation amplifiers 134, 135, 136.

The first terminal voltage detection part 140 includes a U1 terminal voltage detection part 141, a V1 terminal voltage detection part 144, and a W1 terminal voltage detection part 147.

The U1 terminal voltage detection part 141 includes resistors 142, 143 being partial resistors, and connected to the U1 terminal 111 and the first negative-side bus 117. A voltage of a connection point of the resistors 142, 143 is outputted to the control part 40 as a U1 terminal voltage detection value Vu1_d being a detection value in accordance with a U1 terminal voltage Vu1 of the U1 terminal 111.

The V1 terminal voltage detection part 144 includes resistors 145, 146 being partial resistors, and connected to the V1 terminal 112 and the first negative-side bus 117. A voltage of a connection point of the resistors 145, 146 is outputted to the control part 40 as a V1 terminal voltage detection value Vv1_d being a detection value in accordance with a V1 terminal voltage Vv1 of the V1 terminal 112.

The W1 terminal voltage detection part 147 includes resistors 148, 149 being partial resistors, and connected to the W1 terminal 113 and the first negative-side bus 117. A voltage of a connection point of the resistors 148, 149 is outputted to the control part 40 as a W1 terminal voltage detection value Vw1_d being a detection value in accordance with a W1 terminal voltage Vw1 of the W1 terminal 113.

In the second terminal voltage detection part 240, a voltage of a connection point of the resistors 242, 243 is outputted to the control part 40 as a U2 terminal voltage detection value Vu2_d being a detection value in accordance with a terminal voltage Vu2 of the U2 terminal 211. A voltage of a connection point of the resistors 245, 246 is outputted to the control part 40 as a V2 terminal voltage detection value Vv2_d being a detection value in accordance with a terminal voltage Vv2 of the V2 terminal 212. A voltage of a connection point of the resistors 248, 248 is outputted to the control part 40 as a W2 terminal voltage detection value Vw2_d being a detection value in accordance with a terminal voltage Vw2 of the W2 terminal 213.

In the control part 40, the respective terminal voltage detection values are converted based on a resistance ratio, to calculate the respective terminal voltages.

Since the respective terminal voltage detection values before the conversion are values convertible to terminal voltages, it is considered that the first terminal voltage detection part 140 has detected the terminal voltages Vu1, Vv1, Vw1, and the second terminal voltage detection part 240 has detected the terminal voltages Vu2, Vv2, Vw2.

A first pull-up resistor group 150 includes a U1 pull-up resistor 151, a V1 pull-up resistor 152, and a W1 pull-up resistor 153. The U1 pull-up resistor 151 is connected to the first positive-side bus 116 and the U1 terminal voltage detection part 141. The V1 pull-up resistor 152 is connected to the first positive-side bus 116 and the V1 terminal voltage detection part 144. The W1 pull-up resistor 153 is connected to the first positive-side bus 116 and the W1 terminal voltage detection part 147.

A resistance value of each of the resistors constituting the first terminal voltage detection part 140 and a resistance value of each of the resistors constituting the first pull-up resistor group 150 can be set as appropriate. In the present embodiment, the resistance values of all of these resistors are assumed to be the same.

The first capacitor 170 is connected to the first positive-side bus 116 and the first negative-side bus 117 and stores charges, to assist the power supply to the first inverter 120 and suppress a noise component such as a serge current.

The first capacitor voltage detection part 175 includes resistors 176, 177 being partial resistors, and connected to the first positive-side bus 116 and the first negative-side bus 117. A voltage of a connection point of the resistors 176, 177 is outputted to the control part 40 as a detection value in accordance with a first capacitor voltage Vc1 being a voltage of the first capacitor 170. Note that the first capacitor voltage Vc1 can be taken as a voltage of the first positive-side bus 116, or a voltage after relayed, which is a voltage on the downstream side of the first relay part 180.

The first power source relay part 180 includes a first power source relay part 181 and a first reverse connection protection relay 182.

The first power source relay part 181 is provided between the battery 5 and the first inverter 120, the first terminal voltage detection part 140, the first capacitor 170, and the first capacitor voltage detection part 175, and can cut off the power supply from the battery 5 to the first inverter 120.

The first reverse connection protection relay 182 is connected in series with the first power source relay part 181 such that the directions of the first power source relay part 181 and the parasitic diode are reversed to each other. Providing the first reverse connection protection relay 182 prevents a reverse current from flowing when the battery 5 or the like is erroneously connected in a reverse direction.

The relays 181, 182 of the present embodiment are both MOSFETs, but are not restricted to semiconductor relays, but may be mechanical relays. When semiconductor relays or mechanical relays without parasitic diode are employed, the reverse connection protection relay 182 can be omitted.

The rotation angle sensor 30 detects the electric angle θe of the motor 80. The detection value of the rotation angle sensor 30 is outputted to the control part 40.

Figure 5:
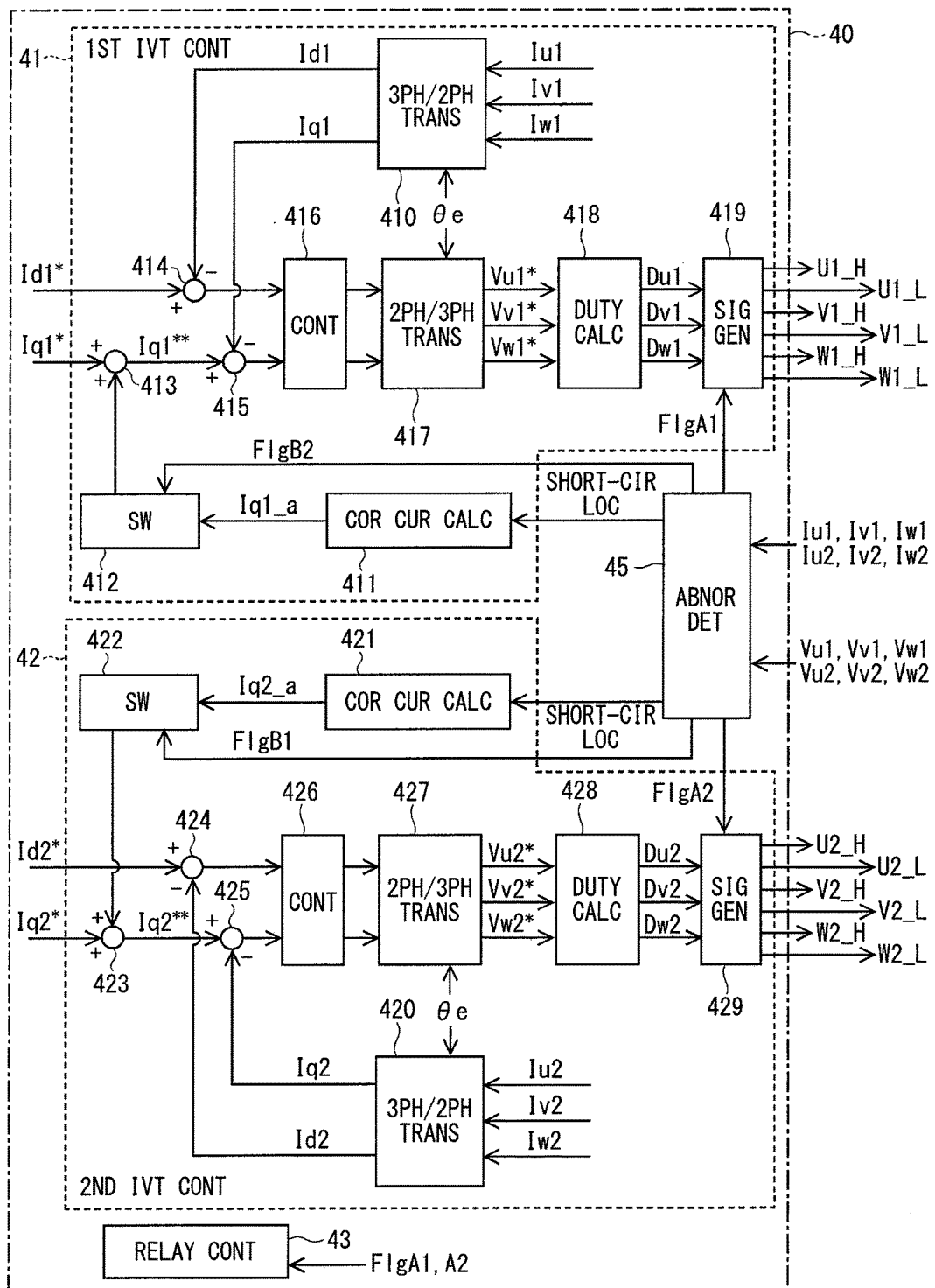
FIG. 5 is a block diagram for explaining a control part according to the first embodiment of the present disclosure.

As shown in FIGS. 4 and 5, the control part 40 is configured mainly of a microcomputer, and the like. Each processing in the control part 40 may be software processing performed by a central processing unit (CPU) executing a previously stored program in a substantive memory device such as a read only memory (ROM), or may be hardware processing performed by a dedicated electronic circuit.

The control part 40 controls the drive of the motor 80 by controlling on-off operation of the upper arm elements 121 to 123, 211 to 213 and the lower arm elements 124 to 126, 214 go 216 based on a torque detection value acquired from the torque sensor 94 (see FIG. 1), a detection value in accordance with the electric angle θe acquired from the rotation angle sensor 30, and the like.

As shown in FIG. 5, the control part 40 includes as a function block a first inverter control part 41, a second inverter control part 42, a relay control part 43, an abnormality determination part 45, and the like.

The first inverter control part 41 includes a three-phase to two-phase transformation part 410, a correction current calculation part 411, a switch part 412, a correction part 413, subtractors 414, 415, a controller 416, a two-phase to three-phase transformation part 417, a duty calculation part 418, and a signal generation part 419.

The second inverter control part 42 includes a three-phase to two-phase transformation part 420, a correction current calculation part 421, a switch part 422, a correction part 423, subtractors 424, 425, a controller 426, a two-phase to three-phase transformation part 427, a duty calculation part 428, and a signal generation part 429.

When the last digits of the three-digit numerals are the same between each calculation part of the first inverter control part 41 and each calculation part of the second inverter control part 42, it means that those calculation parts are similar. Hereinafter, a description will be mainly given of the first inverter control part 41, and a description of the second inverter control part 42 will be omitted as appropriate.

The three-phase to two-phase transformation part 410 performs dq transformation based on the electric angle θ on each of the phase currents Iu1, Iv1, Iw1, calculated based on the detection value of the first current detection part 130, to calculate a d-axis current detection value Id1 and a q-axis current detection value Iq1.

The correction current calculation part 411 calculates a q-axis current correction value Iq1_a for correcting torque ripple which occurs due to counter electromotive force of the motor 80 in accordance with an abnormal location in the second system 201, specified by the abnormality determination part 45.

The switch part 412 switches outputting or non-outputting of the q-axis current correction value Iq1_a. When a switch flag FlgB2 outputted from the abnormality determination part 45 has been set, the switch part 412 outputs the q-axis current correction value Iq1_a. When the switch flag FlgB2 has not been set, the switch part 412 does not output the q-axis current correction value Iq1_a.

Note that as for the second inverter control part 42, the correction current calculation part 421 calculates a q-axis current correction value Iq2_a for correcting torque ripple which occurs due to counter electromotive force of the motor 80 in accordance with a short-circuited location in the first system 101, specified by the abnormality determination part 45.

The switch part 422 switches outputting or non-outputting of the q-axis current correction value Iq2_a. When a switch flag FlgB1 outputted from the abnormality determination part 45 has been set, the switch part 422 outputs the q-axis current correction value Iq2_a. When the switch flag FlgB1 has not been set, the switch part 422 does not output the q-axis current correction value Iq2_a.

Details of processing performed by the correction current calculation parts 411, 421 and the switch parts 412, 422 will be described later.

The correction part 413 corrects a q-axis current command value Iq1* by use of the current correction value Iq1_a outputted from the switch part 412. Note that the q-axis current correction value Iq1_a is regarded as 0 when the current correction value Iq1_a is not outputted. That is, in this case, the q-axis current command value Iq1* is not corrected, and the q-axis current command value Iq1* is taken as a corrected q-axis current command value Iq**. In the present embodiment, the correction part 413 is an adder, and adds the q-axis current correction value Iq1_a to the q-axis current command value Iq1*, to calculate the corrected q-axis current command value Iq1**.

The d-axis subtractor 414 calculates a d-axis current deviation ΔId1 being a deviation between the d-axis current command value Id1* and the d-axis current detection value Id1 that is fed back.

The q-axis subtractor 415 calculates a q-axis current deviation ΔIq1 being a deviation between the corrected q-axis current command value Iq1** and the q-axis current detection value Iq1 that is fed back.

The controller 416 calculates a d-axis voltage command value Vd1* and a q-axis voltage command value Vq1* by PI calculation or the like such that the current deviations ΔId1, ΔIq1 are converged to 0.

The two-phase to three-phase transformation part 417 performs reverse dq transformation based on the electric angle θ on the d-axis voltage command value Vd1* and a q-axis voltage command value Vq1* to calculate a U1 voltage command value Vu1*, a V1 voltage command value Vv1*, and a W1 voltage command value Vw1*.

The duty calculation part 418 performs modulation processing and the like based on the voltage command values Vu1*, Vv1*, Vw1* to calculate the duty command values Du1, Dv1, Dw1.

The signal generation part 419 generates a U1 upper drive signal U1_H for commanding to turning on/off the U1 upper arm element 121, and a U1 lower drive signal U1_L for commanding to turning on/off the U1 lower arm element 124, based on the duty command value Du1 by triangular wave comparison or the like.

The signal generation part 419 generates a V1 upper drive signal V1_H for commanding to turning on/off the V1 upper arm element 122, and a V1 lower drive signal V1_L for commanding to turning on/off the V1 lower arm element 125, based on the duty command value Dv1 by the triangular wave comparison or the like The signal generation part 419 generates a W1 upper drive signal W1_H for commanding to turning on/off the W1 upper arm element 123, and a W1 lower drive signal W1_L for commanding to turning on/off the W1 lower arm element 126, based on the duty command value Dw1 by the triangular wave comparison or the like.

The similar processing is performed also on the second inverter control part 42, to generate a U2 upper drive signal U2_H, a U2 lower drive signal U2_L, a V2 upper drive signal V2_H, a V2 lower drive signal V2_L, a W2 upper drive signal W2_H, and a W2 lower drive signal W2_L.

The drive of the motor 80 is controlled by controlling the first inverter 120 and the second inverter 220 based on the generated drive signals.

The relay control part 43 controls the on-off operation of the relays 181, 182, 281, 282. In the present embodiment, the relays 181, 182 are turned off when an abnormality flag FlgA1 has been set, and the relays 281, 282 are turned off when an abnormality flag FlgA2 has been set.

The abnormality determination part 45 determines whether the abnormality has occurred in the first system 101 or the second system 201, based on each of the phase currents Iu1, Iv1, Iw1, Iu2, Iv2, Iw2. For example, when the sum of three phases of Iu1, Iv1, Iw1 is not 0, that is, when a relation of Iu1+Iv1+Iw1≠0 is satisfied, it can be determined that the abnormality has occurred in the first system 101. Similarly, when the sum of three phases of Iu2, Iv2, Iw2 is not 0, that is, when a relation of Iu2+Iv2+Iw2≠0 is satisfied, it can be determined that the abnormality has occurred in the second system 201.

Hereinafter, a system where abnormality has occurred is appropriately taken as an abnormal system, and a system being normal is as a normal system.

When the abnormality has occurred in the first system 101 while the second system 201 is normal, the drive of the motor 80 is continued in the normal second system 201.

When the abnormality has occurred in the first system 101, the abnormality determination part 45 outputs the abnormality flag FlgA1 to the signal generation part 419. The signal generation part 419 sets the drive signals U1_H, U1_L, V1_H, V1_L, W1_H, W1_L in accordance with the drive of the first inverter 120 to off-commands, to turn off all the SW elements 121 to 126 of the first inverter 120.

Further, the abnormality determination part 45 outputs the abnormality flag FlgA1 to the relay control part 43. The relay control part 43 turns off the relays 181, 182.

When the first system 101 is normal while the abnormality has occurred in the second system 201, the drive of the motor 80 is continued in the normal first system 101.

When the abnormality has occurred in the second system 201, the abnormality determination part 45 outputs the abnormality flag FlgA2 to the signal generation part 429. The signal generation part 429 sets the drive signals U2_H, U2_L, V2_H, V2_L, W2_H, W2_L in accordance with the drive of the second inverter 220 to off-commands, to turn off all the SW elements 221 to 226 of the second inverter 220.

Further, the abnormality determination part 45 outputs the abnormality flag FlgA2 to the relay control part 43. The relay control part 43 turns off the relays 281, 282.

Hereinafter, short-circuit abnormality will be described. Abnormality where the U1 coil 811 is short-circuited with the first positive-side bus 116 or the first negative-side bus 117 is referred to as U1 short-circuit abnormality. The U1 short-circuit abnormality includes U1 power fault abnormality where the U1 coil 811 is short-circuited with the first positive-side bus 116, and U1 ground fault abnormality where the U1 coil 811 is short-circuited with the first negative-side bus 117.

The U1 power fault abnormality includes a case where the U1 coil 811 itself is short-circuited with the first positive-side bus 116, and a case where short circuit failure has occurred in the U1 upper arm element 121. The short circuit failure of the U1 upper arm element 121 includes a case where the element itself has been short-circuited, and a case where the drive signal U1_H is abnormal.

The U1 ground fault abnormality includes a case where the U1 coil 811 itself is short-circuited with the first negative-side bus 117, and a case where short circuit failure has occurred in the U1 lower arm element 124. The short circuit failure of the U1 lower arm element 124 includes a case where the element itself has been short-circuited, and a case where the drive signal U1_L is abnormal.

Abnormality where the current between the V1 coil 812 and the first positive-side bus 116 or the first negative-side bus 117 cannot be cut off is referred to as V1 short-circuit abnormality. The V1 short-circuit abnormality includes V1 power fault abnormality and V1 ground fault abnormality.

Abnormality where the current between the W1 coil 813 and the first positive-side bus 116 or the first negative-side bus 117 cannot be cut off is referred to as W1 short-circuit abnormality. The W1 short-circuit abnormality includes W1 power fault abnormality and W1 ground fault abnormality.

Details of the power fault abnormality and the ground fault abnormality of the V-phase and the W-phase are similar to those of the power fault abnormality and the ground fault abnormality of the U-phase.

Short-circuit abnormality of each phase on the second system 201 side is similar to the above, and a description thereof will thus be omitted.

When the drive of the motor 80 is continued using the second system 201 in a state where the short-circuit abnormality has occurred in the first system 101, a reflux current is generated by counter electromotive force to cause occurrence of torque ripple.

Similarly, when the drive of the motor 80 is continued using the first system 101 in a state where the short-circuit abnormality has occurred in the second system 201, a reflux current is generated by counter electromotive force to cause occurrence of torque ripple.

In the present embodiment, the abnormality determination part 45 specifies a phase where the power fault abnormality or the ground fault abnormality has occurred based on a terminal voltage of the abnormal system, with the motor 80 in the rotating state. Further, a corresponding amount of the torque ripple in accordance with the short-circuited location is compensated on the normal system side, to reduce the torque ripple caused by the counter electromotive force at the time of single-system drive.

Figure 6:
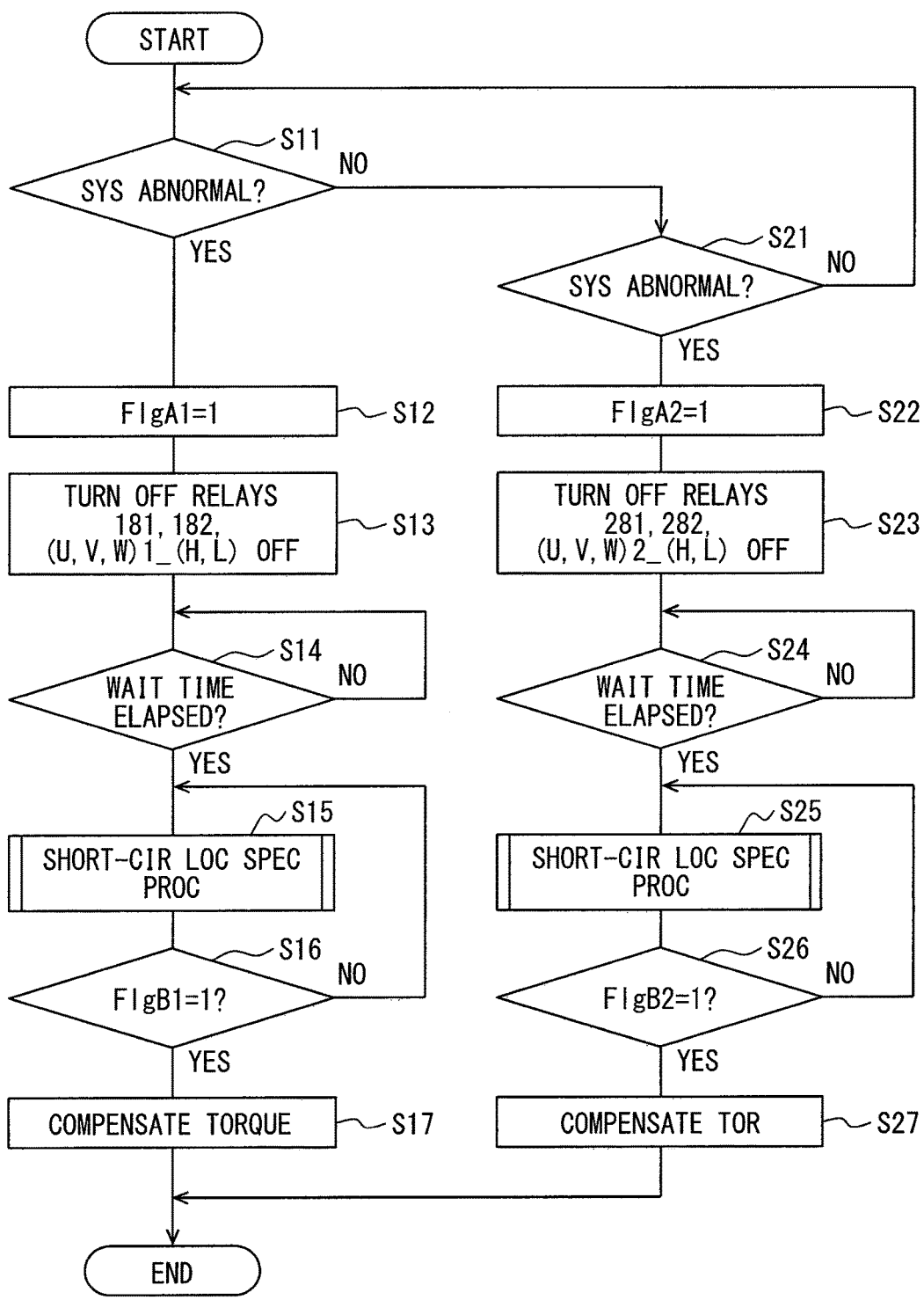
FIG. 6 is a flowchart for explaining abnormality determination processing according to the first embodiment of the present disclosure.

Abnormality determination processing in the present embodiment will be described based on a flowchart shown in FIG. 6. In the figure, the first system 101 is denoted by "SYSTEM 1", and the second system 201 is denoted by "SYSTEM 2". It is assumed here that at least either the first system 101 or the second system 201 is normal. When both the first system 101 and the second system 202 are abnormal, the relay parts 180, 280 are turned off to stop the motor 80. Here, the relay parts 180, 280 are assumed to be normal. Abnormality of the relay parts 180, 280 is assumed to be monitored by separate processing.

In Step S11, first, the abnormality determination part 45 determines whether the first system 101 is abnormal. Hereinafter, "Step" of Step S11 is omitted and simply denoted by symbol "S". This also applies to the other steps. When the first system 101 is determined to be normal (S11: NO), the processing proceeds to S21. When the first system 101 is determined to be abnormal (S11: YES), the processing proceeds to S12.

In S12 to which the processing proceeds when the first system 101 is abnormal and the second system 201 is normal, the abnormality determination part 45 sets the abnormality flag FlgA1 and outputs the flag to the signal generation part 419 and the relay control part 43.

In S13, the relay control part 43 turns off the relays 181, 182 to stop the power supply from the battery 5 to the first inverter 120 side. Further, the signal generation part 419 sets the drive signals U1_H, U1_L, V1_H, V1_L, W1_H, W1_L to off-commands so as to turn off all the SW elements 121 to 126 of the first inverter 120. In the figure, the drive signals U1_H, U1_L, V1_H, V1_L, W1_H, W1_L are denoted by "(U, V, W)1_(H, L)".

In S14, the abnormality determination part 45 turns off the relays 181, 182 and determines whether waiting time Ts has elapsed. The waiting time Ts is the time required for the first capacitor voltage Vc1 to get down an abnormality-determinable upper limit voltage due to discharge of the first capacitor 170. Note that the first capacitor voltage Vc1 is used in place of the elapsed time from turning-off of the relays 181, 182, and the positive determination may be made in the case where the first capacitor voltage Vc1 becomes equal to or lower than the upper limit voltage based on the first capacitor voltage Vc1. When it is determined that the waiting time Ts has not elapsed from the turning-off of the relays 181, 182 (S14: NO), that is, when it is estimated that the first capacitor voltage Vc1 is higher than abnormality-determinable upper limit voltage, this determination processing is repeated. When it is determined that the waiting time Ts has elapsed from the turning-off of the relays 181, 182 (S14: YES), that is, when it is estimated that the first capacitor voltage Vc1 is not higher than abnormality-determinable upper limit voltage, the processing proceeds to S15.

In S15, the abnormality determination part 45 performs the short-circuited location specifying processing for the first system 101. When a short-circuited phase is one phase, the switch flag FlgB1 is set. When the short-circuited phase is not specified, or when a plurality of short-circuited phases are specified, the switch flag FlgB1 is not set. A detail of the short-circuited location specifying processing will be described later based on a sub-flow shown in FIG. 7.

In S16 to which the processing proceeds after completion of the short-circuited location specifying processing, the abnormality determination part 45 determines whether the switch flag FlgB1 has been set. When the switch flag FlgB1 is determined not to have been set (S16: NO), the processing returns to S15, and the short-circuited location specifying processing is repeated. When the switch flag FlgB1 is determined to have been set (S16: NO), the processing proceeds to S17.

In S17, torque compensation for compensating torque ripple in accordance with an abnormal location in the first system 101 is performed in the second system 201 that is normal. Specifically, the switch part 422 outputs the q-axis current correction value Iq2_$a$ calculated in the correction current calculation part 421.

Figure 8A:
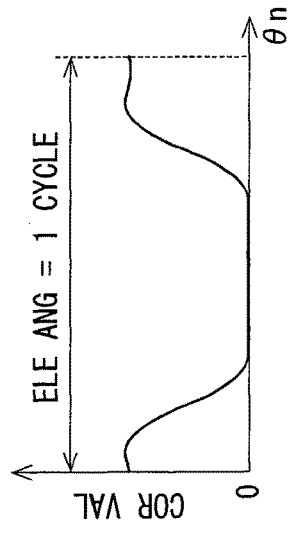
FIGS. 8A to 8F are explanatory diagrams for explaining a q-axis current correction value according to the first embodiment of the present disclosure.
Figure 8B:
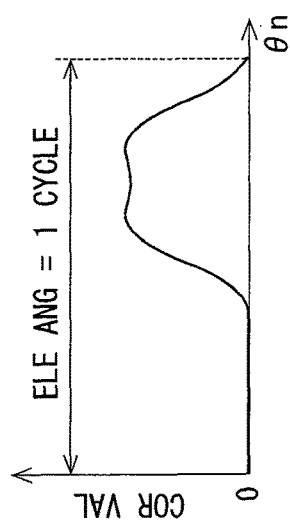
Figure 8C:
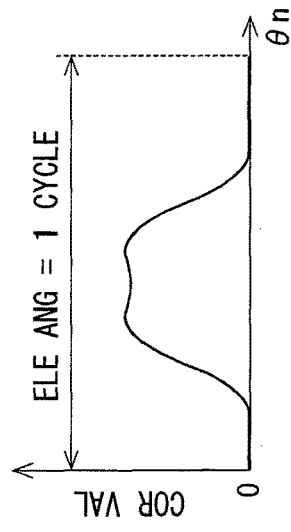
Figure 8D:
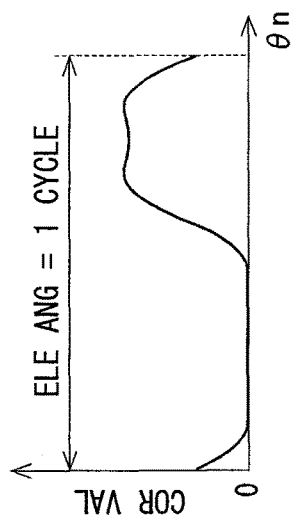
Figure 8E:
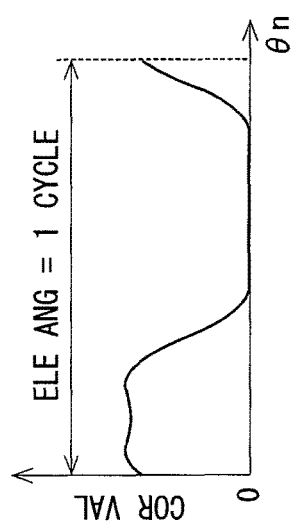
Figure 8F:
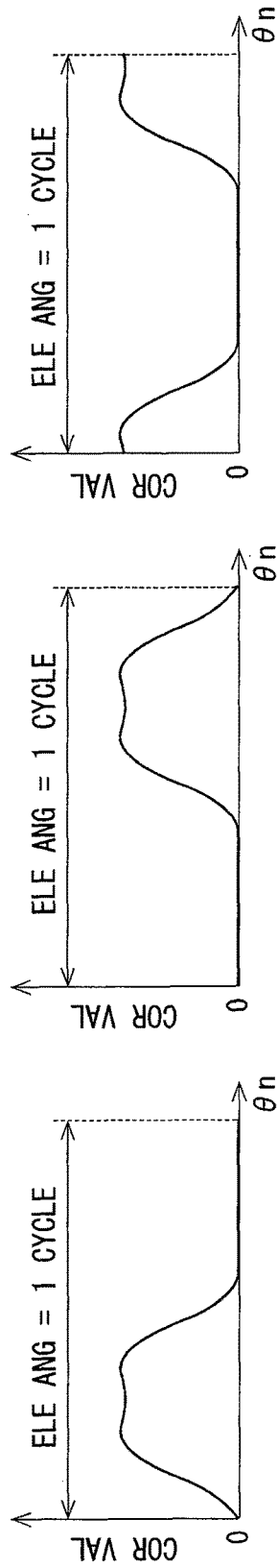

In the correction current calculation part 421, the q-axis current correction value Iq2_$a$ is calculated based on the first electric angle θ1, by use of a map in accordance with the abnormal location in the first system 101. FIGS. 8A to 8F each show the map used for calculation of the q-axis current correction value Iq2_a. FIGS. 8A to 8F show the q-axis current correction value Iq2_a at the time of positive rotation, where FIG. 8A is the time of U1 power fault abnormality, FIG. 8B is the time of V1 power fault abnormality, FIG. 8C is the time of W1 power fault abnormality, FIG. 8D is the time of U1 ground fault abnormality, FIG. 8E is the time of V1 ground fault abnormality, and FIG. 8F is the time of W1 ground fault abnormality. At the time of negative rotation, multiplication by −1 is performed to obtain a positive/negative reversed value.

In the figures, "n" in "θn" is "1" or "2", and thus means that "θn" is the first electric angle θ1 or the second electric angle θ2. Further, in FIGS. 8A to 8F, the q-axis d current correction value Iqn_a is simply referred to as "CORRECTION VALUE".

Referring back to FIG. 6, in S21 to which the processing proceeds when the first system 101 is determined to be normal (S11: NO), it is determined whether the second system 201 is abnormal. When the second system 202 is determined to be normal (S21: NO), and the processing returns to S11. That is, when the first system 101 and the second system 201 are both normal, the determination processing of S11 and S21 is repeated. When the second system 201 is determined to be abnormal (S21: YES), the processing proceeds to S22.

Since processing of S22 to S27 corresponds to the processing of S12 to S17, the description thereof will be omitted as appropriate.

In S22 to which the processing proceeds when the second system 201 is abnormal and the first system 101 is normal, the abnormality determination part 45 sets the abnormality flag FlgA2 and outputs the flag to the signal generation part 419 and the relay control part 43.

In S23, the relay control part 43 turns off the relays 281, 282 to stop the power supply from the battery 5 to the second inverter 220 side. The signal generation part 429 sets the drive signals U2_H, U2_L, V2_H, V2_L, W2_H, W2_L to off-commands. In the figure, the drive signals U2_H, U2_L, V2_H, V2_L, W2_H, W2_L are denoted by "(U, V, W)2_(H, L)".

In S24, the abnormality determination part 45 determines whether the waiting time Ts has elapsed. When it is determined that the waiting time Ts has not elapsed (S24: NO), this determination processing is repeated. When it is determined that the waiting time Ts has elapsed (S24: YES), the processing proceeds to S25.

In S25, the abnormality determination part 45 performs the short-circuited location specifying processing for the second system 201. When a short-circuited phase is one phase, the switch flag FlgB2 is set. When the short-circuited phase is not specified, or when a plurality of short-circuited phases are specified, the switch flag FlgB2 is not set.

In S26 to which the processing proceeds after completion of the short-circuited location specifying processing, the abnormality determination part 45 determines whether the switch flag FlgB2 has been set. When the switch flag FlgB2 is determined not to have been set (S26: NO), the short-circuited location specifying processing is repeated. When the switch flag FlgB2 is determined to have been set (S26: YES), the processing proceeds to S27.

In S27, torque compensation for compensating torque ripple in accordance with an abnormal location in the second system 201 is performed in the first system 101 that is normal. Specifically, the switch part 412 outputs the q-axis current correction value Iq1_a calculated in the correction current calculation part 411.

In the correction current calculation part 411, the q-axis current correction value Iq1_a is calculated based on the second electric angle θ2, by use of the map (see FIGS. 8A to 8F) in accordance with the abnormal location in the second system 201.

Figure 7:
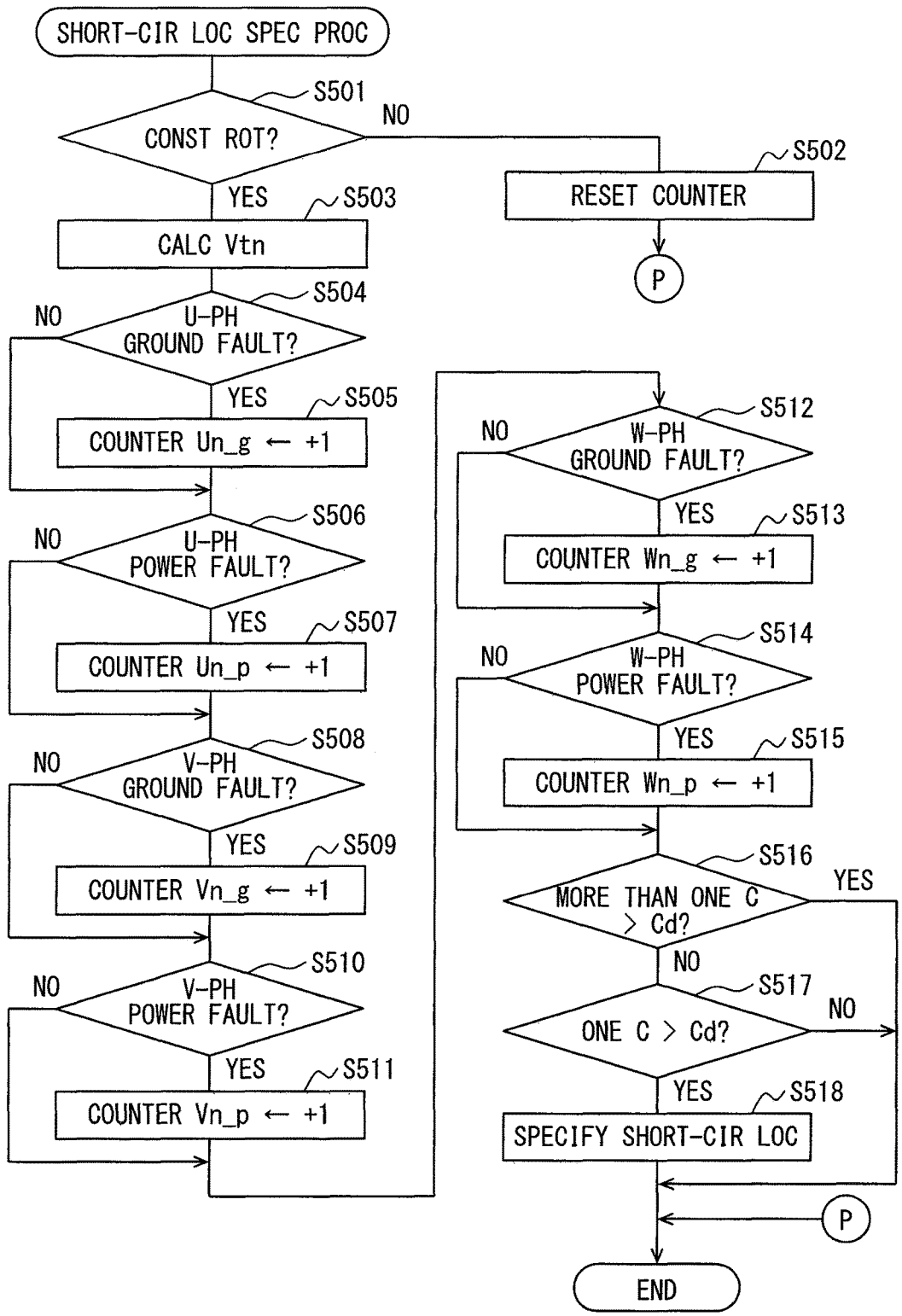
FIG. 7 is a flowchart for explaining short-circuited location specifying processing according to the first embodiment of the present disclosure.

FIG. 7 shows a sub-flow in accordance with the short-circuited location specifying processing. In S15, a relation of n=1 is assumed, and the short-circuited location in the first system 101 is specified based on a first terminal voltage average value Vt1 described later. In S25, a relation of n=2 is assumed, and the short-circuited location in the second system 201 is specified based on a second terminal voltage average value Vt2 described later.

Hereinafter, the processing of specifying the short-circuited location in the first system 101 will be mainly described. Note that in the processing of specifying the short-circuited location in the second system 201, the second terminal voltage average value Vt2 is used in place of the first terminal voltage average value Vt1, and the second electric angle θ2 is used in place of the first electric angle θ1.

In S501, it is determined whether the motor 80 is constantly rotating. In the present embodiment, when a state where the rotational speed of the motor 80 is within a predetermined range is kept for a predetermined time or longer, it is assumed that the motor 80 is constantly rotating and the determinable condition is satisfied. The "predetermined range" in accordance with the rotational speed of the motor 80 is settable as appropriate, and for example, set to not less than 500 [rpm] and not more than 1000 [rpm]. The continuation time is also settable as appropriate. When the motor 80 is determined to be constantly rotating (S501: YES), the processing proceeds to S503. When the motor 80 is determined not to be constantly rotating (S501: NO), the processing proceeds to S502.

In S502, each counter in accordance with the short-circuited location determination is reset, and the processing returns to the main flow.

In S503 to which the processing proceeds when the motor 80 is determined to be constantly rotating (S501: YES), the abnormality determination part 45 calculates the first terminal voltage average value Vt1 being an average value of the terminal voltages Vu1, Vv1, Vw1. The first terminal voltage average value Vt1 is calculated by Formula (3-1). Formula (3-1) is an example of a case where resistance values of the resistors 142, 143, 145, 146, 148, 149 are the same. A coefficient by which the terminal voltage detection values Vu1_d, Vv1_d, Vw1_d are multiplied is set as appropriate in accordance with the resistance values. This also applies to Formula (3-2).

$$Vt1 = (Vu1 + Vv1 + Vw1)/3 \quad (3\text{-}1)$$
$$= (Vu1\_d \times 2 + Vv1\_d \times 2 + Vw1\_d \times 2)/3$$

When the short-circuited location in the second system 201 is to be specified, the abnormality determination part 45 calculates the second terminal voltage average value Vt2. The second terminal voltage average value Vt2 is calculated by Formula (3-2).

$$Vt2 = (Vu2 + Vv2 + Vw2)/3 \quad (3\text{-}2)$$
$$= (Vu2\_d \times 2 + Vv2\_d \times 2 + Vw2\_d \times 2)/3$$

In addition, when the short-circuited location in the first system 101 is to be specified, since the relay part 180 is off and the SW elements 121 to 126 are off-commands, the terminal voltages Vu1, Vv1, Vw1 are caused by counter electromotive force that is generated by the rotation of the motor 80. Further, when the short circuit in the second system 201 is to be specified, since the SW elements 221 to 226 are off-commands, the terminal voltages Vu2, Vv2, Vw2 are caused by counter electromotive force that is generated by the rotation of the motor 80.

In S504, when the first electric angle $\theta 1$ is within a U-phase ground fault determination range, the abnormality determination part 45 performs U-phase ground fault determination. The U-phase ground fault determination range at the time of positive rotation of the motor 80 is $240 \leq \theta 1 \leq 300$, and the U-phase ground fault determination range at the time of negative rotation of the motor 80 is $60 \leq \theta 1 \leq 120$. The ground fault determination range is set as appropriate in accordance with phase placement of the first winding set 810 and the definition of the electric angle. This also applies to the power fault determination range.

When the first terminal voltage average value Vt1 in the case of the first electric angle $\theta 1$ being within the U-phase ground fault determination range is not larger than a ground fault determination threshold Vth_g, the abnormality determination part 45 regards the U-phase as having a ground fault. With a detected error or the like taken into consideration, the ground fault determination threshold Vth_g is set to an arbitrary predetermined value (e.g., 0.3 [V]) close to 0. When the first electric angle $\theta 1$ is out of the U-phase ground fault determination range, the U-phase ground fault determination is not performed. This also applies to the ground faults of the V-phase and the W-phase.

When the U-phase does not have a ground fault, or when the ground fault determination is not performed (S504: NO), the processing proceeds to S506. When the U-phase is determined to have a ground fault (S504: YES), the processing proceeds to S505.

In S505, the abnormality determination part 45 increments a U-phase ground fault counter U1_g.

In S506, when the first electric angle $\theta 1$ is within a U-phase power fault determination range, the abnormality determination part 45 performs U-phase power fault determination. The U-phase power fault determination range at the time of positive rotation of the motor 80 is $60 \leq \theta 1 \leq 120$, and the U-phase power fault determination range at the time of negative rotation of the motor 80 is $240 \leq \theta 1 \leq 300$.

When the first terminal voltage average value Vt1 in the case of the first electric angle $\theta 1$ being within the U-phase power fault determination range is not smaller than a power fault determination threshold Vth_p, the abnormality determination part 45 regards the U-phase as having a power fault. With a detected error or the like taken into consideration, the power fault determination threshold Vth_p is set as appropriate in accordance with the first capacitor voltage Vc1 so as to become a value close to the first capacitor voltage Vc1. In the present embodiment, the power fault determination threshold Vth_p is a value obtained by multiplying the first capacitor voltage Vc1 by a predetermined coefficient (e.g., 0.9). When the short-circuited location in the second system 202 is specified, a second capacitor voltage Vc2 is used in place of the first capacitor voltage Vc1. When the first electric angle $\theta 1$ is out of the U-phase power fault determination range, the U-phase power fault determination is not performed. This also applies to power faults of the V-phase and the W-phase.

When the U-phase does not have a power fault, or when the power fault determination is not performed (S506: NO), the processing proceeds to S508. When the U-phase is determined to have a power fault (S504: YES), the processing proceeds to S507.

In S507, the abnormality determination part 45 increments a U-phase power fault counter U1_p.

In S508, when the first electric angle $\theta 1$ is within a V-phase ground fault determination range, the abnormality determination part 45 performs V-phase ground fault determination. The V-phase ground fault determination range at the time of positive rotation of the motor 80 is $0 \leq \theta 1 \leq 60$, and the V-phase ground fault determination range at the time of negative rotation of the motor 80 is $180 \leq \theta 1 \leq 240$.

When the first terminal voltage average value Vt1 in the case of the first electric angle $\theta 1$ being within the V-phase ground fault determination range is not larger than a ground fault determination threshold Vth_g, the abnormality determination part 45 regards the V-phase as having a ground fault.

When the V-phase does not have a ground fault, or when the ground fault determination is not performed (S508: NO), the processing proceeds to S510. When the V-phase is determined to have a ground fault (S508: YES), the processing proceeds to S509.

In S509, the abnormality determination part 45 increments a V-phase ground fault counter V1_g.

In S510, when the first electric angle $\theta 1$ is within a V-phase power fault determination range, the abnormality determination part 45 performs V-phase power fault determination. The V-phase power fault determination range at the time of positive rotation of the motor 80 is $180 \leq \theta 1 \leq 240$, and the V-phase power fault determination range at the time of negative rotation of the motor 80 is $0 \leq \theta 1 \leq 60$.

When the first terminal voltage average value Vt1 in the case of the first electric angle $\theta 1$ being within the V-phase power fault determination range is not smaller than the power fault determination threshold Vth_p, the abnormality determination part 45 regards the V-phase as having a power fault.

When the V-phase does not have a power fault, or when the power fault determination is not performed (S510: NO), the processing proceeds to S512. When the V-phase is determined to have a power fault (S510: YES), the processing proceeds to S511.

In S511, the abnormality determination part 45 increments a V-phase power fault counter V1_p.

In S512, when the first electric angle $\theta 1$ is within a W-phase ground fault determination range, the abnormality determination part 45 performs W-phase ground fault determination. The W-phase ground fault determination range at the time of positive rotation of the motor 80 is $120 \leq \theta 1 \leq 180$, and the W-phase ground fault determination range at the time of negative rotation of the motor 80 is $300 \leq \theta 1 \leq 360$.

When the first terminal voltage average value Vt1 in the case of the first electric angle $\theta 1$ being within the W-phase ground fault determination range is not larger than a ground fault determination threshold Vth_g, the abnormality determination part 45 regards the W-phase as having a ground fault.

When the W-phase does not have a ground fault, or when the ground fault determination is not performed (S512: NO), the processing proceeds to S514. When the W-phase is determined to have a ground fault (S512: YES), the processing proceeds to S513.

In S513, the abnormality determination part 45 increments a W-phase ground fault counter W1_g.

In S514, when the first electric angle $\theta 1$ is within a W-phase power fault determination range, the abnormality determination part 45 performs W-phase power fault determination. The W-phase power fault determination range at the time of positive rotation of the motor 80 is 300≤θ1≤360, and the W-phase power fault determination range at the time of negative rotation of the motor 80 is 120≤θ1≤180.

When the first terminal voltage average value Vt1 in the case of the first electric angle θ1 being within the W-phase power fault determination range is not smaller than the power fault determination threshold Vth_p, the abnormality determination part 45 regards the W-phase as having a power fault.

When the W-phase does not have a power fault, or when the power fault determination is not performed (S514: NO), the processing proceeds to S516. When the W-phase is determined to have a power fault (S514: YES), the processing proceeds to S515.

In S515, the abnormality determination part 45 increments a W-phase power fault counter W1_p.

Note that in FIG. 7, the U-phase ground fault, the U-phase power fault, the V-phase ground fault, the V-phase power fault, the W-phase ground fault, the W-phase power fault are determined in this order in S504 to S515, but the order may not be set or may be switched.

In S516, the abnormality determination part 45 determines whether the number of counters with a count value C being larger than an abnormality decision value Cd is one or larger than one. When the number of ground fault counters or power fault counters with the count value C being larger than the abnormality decision value Cd is determined to be larger than one (S516: YES), the switch flag FlgB1 is not set, and the short-circuited location specifying processing is completed. That is, when the count value C is larger than the abnormality decision value Cd in a plurality of counters and a plurality of phases are specified as the short-circuited phases, the short circuit is not caused by a short circuit in the above location, but may be caused by another abnormality such as a short circuit of a partial resistor on the high potential side of the terminal voltage detection part or a short circuit of the pull-up resistor. Accordingly, when the torque compensation is performed considering that a plurality of phases have been short-circuited although the short circuit is caused by another abnormality, it may lead to further increase in torque ripple. Hence, in the present embodiment, when a plurality of phases are specified as the short-circuited phases, the torque compensation is not performed, to prevent the torque ripple from increasing.

When it is determined that the number of counters with the count value C being larger than the abnormality decision value Cd is not larger than 1 (S516: NO), the processing proceeds to S517.

In S517, the abnormality determination part 45 determines whether the number of ground fault counters or power fault counters with the count value C being larger than the abnormality decision value Cd is one. When it is determined that there is no ground fault counter or power fault counter with the count value C being larger than the abnormality decision value Cd (S517: NO), the switch flag FlgB1 is not set, and the short-circuited location specifying processing is completed. When it is determined that the number of ground fault counters or power fault counters with the count value C being larger than the abnormality decision value Cd is one (S517: YES), the processing proceeds to S518.

In S518, the abnormality determination part 45 decides that short-circuit abnormality has occurred in a location corresponding to the ground fault counter or the power fault counter with the count value C being larger than the abnormality decision value Cd. For example, when the count value C of the U-phase ground fault counter U1_g is larger than the abnormality decision value Cd, the U-phase of the first system 101 is specified as having a ground fault. In other words, when the count value C of the U-phase ground fault counter U1_g is larger than the abnormality decision value Cd, the abnormality determination part 45 specifies the short-circuited phase as the U-phase of the first system 101, and the short-circuited state as the ground fault. Further, when the count value C of the U-phase power fault counter U1_p is larger than the abnormality decision value Cd, the U-phase of the first system 101 is specified as having a power fault. In other words, when the count value C of the U-phase power fault counter U1_p is larger than the abnormality decision value Cd, the abnormality determination part 45 specifies the short-circuited phase as the U-phase of the first system 101, and the short-circuited state as the power fault. This also applies to the ground faults and power faults of the other phases.

Further, the abnormality determination part 45 outputs information in accordance with the specified short-circuited location to the correction current calculation part 421. Moreover, the abnormality determination part 45 outputs the switch flag FlgB1 to the switch part 422.

Figure 9A:
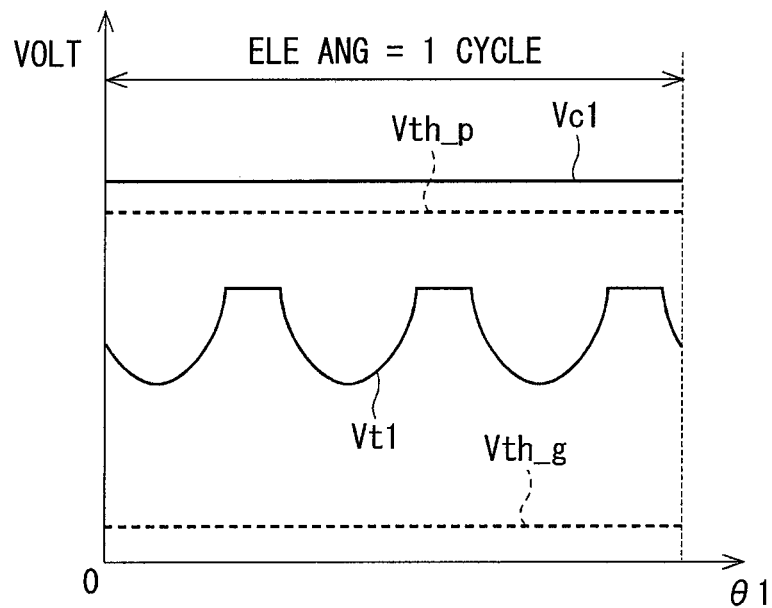
FIG. 9A is an explanatory view for explaining an average value of terminal voltages at the time of single-system drive when short-circuit abnormality has not occurred in the first embodiment of the present disclosure.
Figure 9B:
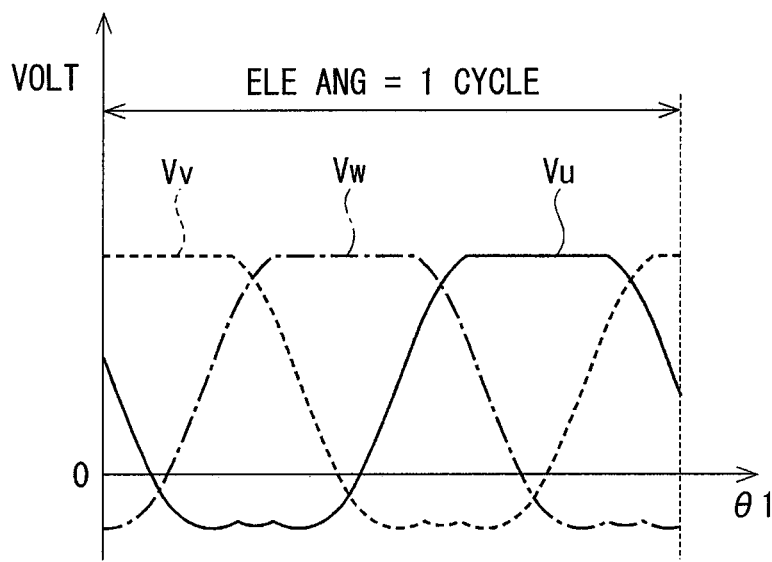
FIG. 9B is an explanatory view for explaining a terminal voltage of each phase at the time of single-system drive when short-circuit abnormality has not occurred in the first embodiment of the present disclosure.
Figure 10A:
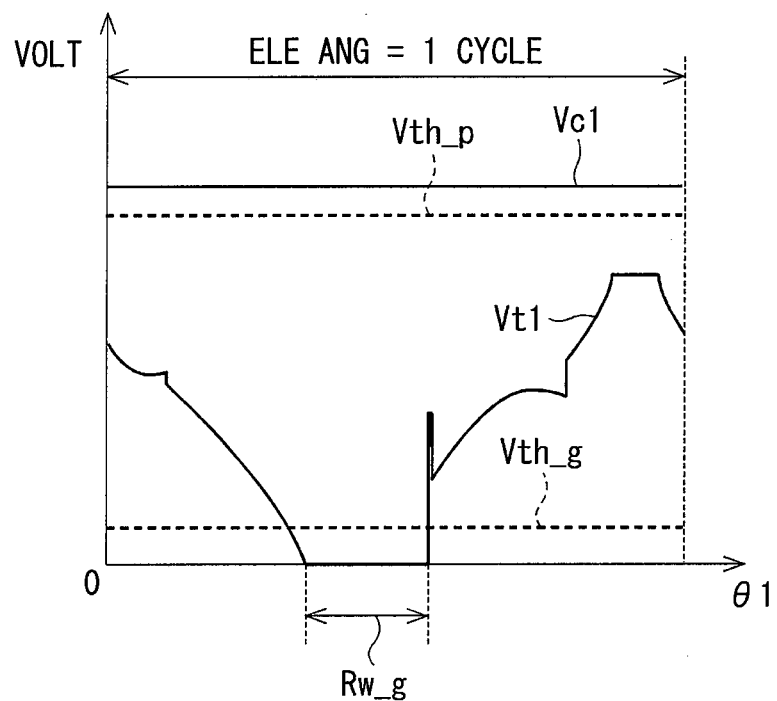
FIG. 10A is an explanatory view for explaining an average value of terminal voltages at the time of single-system drive when W-phase ground fault abnormality has occurred in the first embodiment of the present disclosure.
Figure 10B:
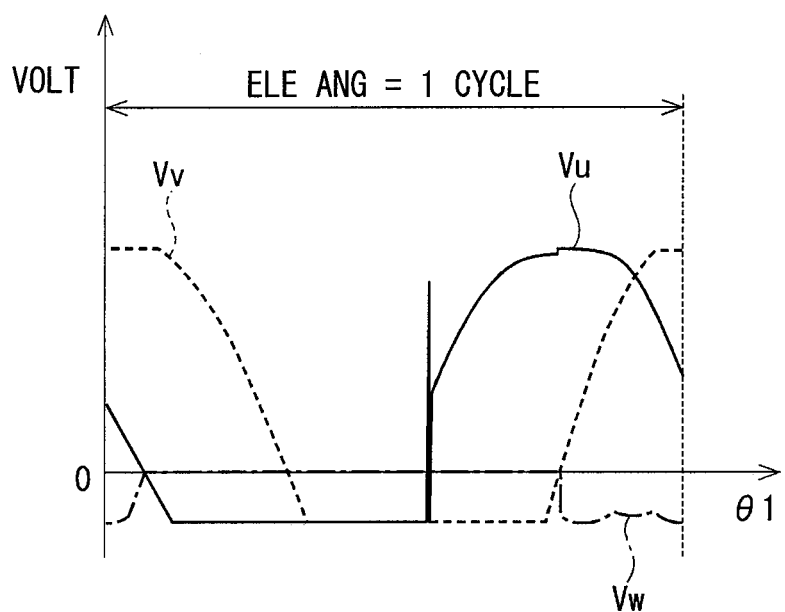
FIG. 10B is an explanatory view for explaining a terminal voltage of each phase at the time of single-system drive when W-phase ground fault abnormality has occurred in the first embodiment of the present disclosure.
Figure 11A:
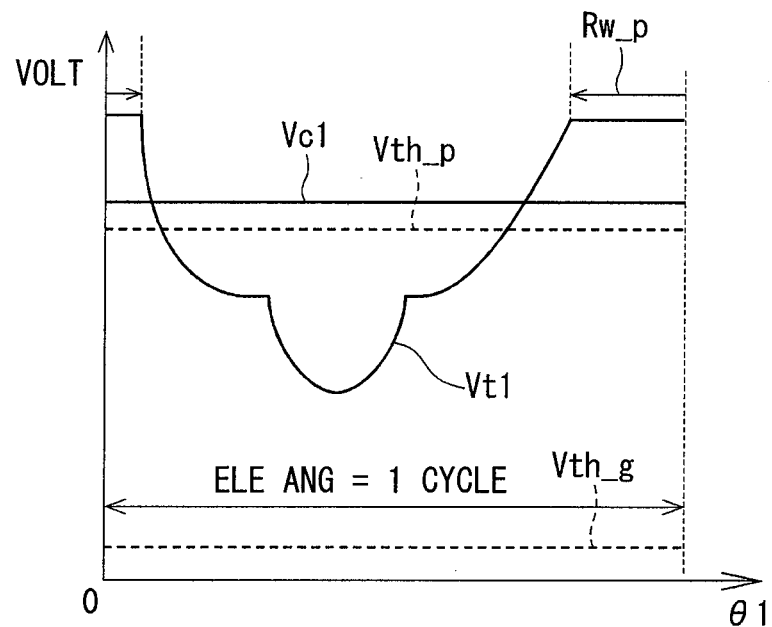
FIG. 11A is an explanatory view for explaining an average value of terminal voltages at the time of single-system drive when W-phase power fault abnormality has occurred in the first embodiment of the present disclosure.
Figure 11B:
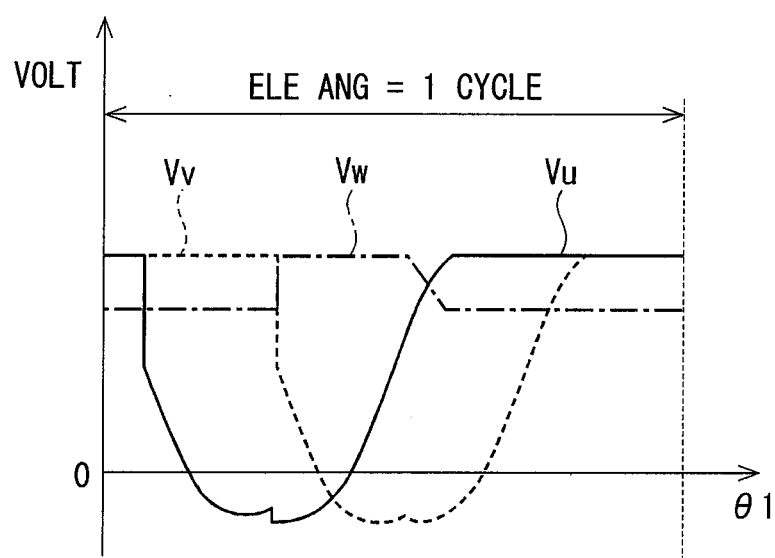
FIG. 11B is an explanatory view for explaining a terminal voltage of each phase at the time of single-system drive when W-phase power fault abnormality has occurred in the first embodiment of the present disclosure.

Here, FIGS. 9A to 11B show simulation results in a case where the abnormality occurs in the first system 101 and the motor 80 is positively rotated by the single-system drive using the second system 201. In each of FIGS. 9A to 11B, the first electric angle θ1 is taken as a horizontal axis. FIGS. 9A, 10A, and 11A show the first capacitor voltage Vc1 and the first terminal voltage average value Vt1, and FIGS. 9B, 10B, and 11B show the terminal voltages Vu1, Vv1, Vw1 of the respective phases.

FIGS. 9A and 9B are examples of the case where abnormality other than the short-circuit abnormality (e.g., open failure) has occurred in the first system 101. When the abnormality having occurred in the first system 101 is other than the short-circuit abnormality, the drive signals U1_H, U1_L, V1_H, V1_L, W1_H, W1_L are set to the off-commands so that a current by counter electromotive force, generated by the rotation of the motor 80, does not flow on the first inverter 120 side. Accordingly, as shown in FIG. 9A, the first terminal voltage average value Vt1 in a case where the short-circuit abnormality has not occurred in the first system 101 and the single-side drive is performed in the second system 201 does not depend on the first electric angle θ1 and is in a range larger than the ground fault determination threshold Vth_g and smaller than power fault determination threshold Vth_p.

Further, in the present embodiment, when the abnormality in the first system 101 is other than the short-circuit abnormality and the single-system drive is performed in the second system 201, the torque compensation for compensating a corresponding amount of the torque ripple is not performed.

FIGS. 10A and 10B are examples of the case where the W-phase ground fault abnormality has occurred in the first system 101. As shown in FIG. 10A, when the W-phase ground fault abnormality has occurred in the first system 101, the terminal voltage average value Vt1 is not larger than the ground fault determination threshold Vth_g in an angle range Rw_g including 120≤θ1≤180 which is the W-phase ground fault determination range. Further, the terminal voltage average value Vt1 of each of the U-phase and V-phase ground fault determination ranges is larger than the ground fault determination threshold Vth_g. Hence, it is possible to appropriately specify a phase where the ground fault abnormality has occurred.

FIGS. 11A and 11B are examples of the case where the W-phase power fault abnormality has occurred in the first system 101. As shown in FIG. 11A, when the W-phase power fault abnormality has occurred in the first system 101, the terminal voltage average value Vt1 is not smaller than the power fault determination threshold Vth_p in an angle range Rw_p including 300≤θ1≤360 which is a W-phase power fault determination range. Further, the terminal voltage average value Vt1 of each of the U-phase and V-phase power fault determination ranges is smaller than the power fault determination threshold Vth_p. Hence it is possible to appropriately specify a phase where the power fault abnormality has occurred.

While the example where the W-phase has a power fault or a ground fault has been shown here, descriptions of the power faults and the ground faults of the U-phase and the V-phase are omitted since they are similar to the power fault and the ground fault of the W-phase except for the difference in phase. Moreover, when abnormality occurs in the second system 201, the second electric angle θ2 is used in place of the first electric angle θ1, and the second terminal voltage average value Vt2 is used in place of the first terminal voltage average value Vt1, whereby it is possible to appropriately specify a phase where the ground fault abnormality or the power fault abnormality has occurred in a similar manner to the above.

As described above, the motor control device 1 of the present embodiment controls the motor 80 having the plurality of winding sets 810, 820. The winding sets 810, 820 each include the coils 811 to 813, 821 to 823 of the plurality of phases.

The motor control device 1 includes the inverters 120, 220, the power source relay parts 180, 280, the terminal voltage detection parts 140, 240, and the control part 40.

The inverters 120, 220 are provided for the respective winding sets 810, 820, and convert the power of the motor 80.

The power source relay parts 180, 280 are provided corresponding to the respective inverters 120, 220, and can cut off power supply from the battery 5 to the inverters 120, 220. That is, the first power source relay part 180 can cut the power supply from the battery 5 to the first inverter 120, and the second power source relay part 280 can cut off the power supply from the battery 5 to the second inverter 220.

The terminal voltage detection parts 140, 240 detect the terminal voltages Vu1, Vv1, Vw1, Vu2, Vv2, Vw2 of the coils 811 to 813, 821 to 823.

The control part 40 includes the inverter control parts 41, 42, the relay control part 43, and the abnormality determination part 45.

The inverter control parts 41, 42 control the inverters 120, 220. Specifically, the first inverter control part 41 controls the on-off operation of the SW elements 121 to 126 in the first inverter 120, and the second inverter control part 42 controls the on-off operation of the SW elements 221 to 226 in the second inverter 220.

The relay control part 43 controls the power source relay parts 180, 280.

The abnormality determination part 45 determines abnormality in the inverters 120, 220 and the winding sets 810, 820.

In the present embodiment, the combinations of the winding sets 810, 820 and the inverters 120, 220 which correspond to each other are taken as "systems". That is, the combination of the first winding set 810 and the first inverter 120 is taken as the first system 101, and the combination of the second winding set 820 and the second inverter 220 is taken as the second system 201. Further, a system where abnormality has occurred is taken as an abnormal system, and a system being normal is as a normal system. Hereinafter, a description will be given assuming that the first system 101 is the abnormal system and the second system 201 is the normal system.

When the motor 80 is being driven using the second system 201 that is the normal system, the relay control part 43 controls the first power source relay part 180 so as to cut off the power supply from the battery 5 to the first inverter 120 in the first system 101 that is the abnormal system.

Further, the abnormality determination part 45 specifies a short-circuited location based on the terminal voltages Vu1, Vv1, Vw1 of the first system 101. Herein, "specify a short-circuited location" means to specify a short-circuited phase and also specify whether the short-circuited phase has a ground fault or a power fault.

In accordance with the short-circuited location, the second inverter control part 42 corrects a command value related to control of the second inverter 220 in the second system 202 that is the normal system. In the present embodiment, the second inverter control part 42 corrects a q-axis current command value Iq2*.

In the present embodiment, in a state where the power supply from the battery 5 to the first inverter 120 is cut off by the power source relay part 180 in the first system 101 that is the abnormal system, a short-circuited location is specified based on the terminal voltages Vu1, Vv1, Vw1 generated by the counter electromotive force of the motor 80. Hence, it is possible to appropriately specify the short-circuited location, with the motor 80 in the rotating state.

Further, the q-axis current command value Iq2* is corrected in accordance with the short-circuited location such that the torque generated by the current flowing in the short-circuited phase is compensated. Accordingly, the torque generated by the current flowing in the short-circuited phase due to the counter electromotive force is compensated, to thereby enable reduction in torque ripple.

The terminal voltage detection parts 140, 240 detect the terminal voltages Vu1, Vv1, Vw1, Vu2, Vv2, Vw2 for the respective phases.

The abnormality determination part 45 specifies a short-circuited location based on the terminal voltage average value Vt1 that is an average value of the terminal voltages Vu1, Vv1, Vw1 of the respective phases of the first system 101 that is the abnormal system.

It is thereby possible to appropriately specify the short-circuited location based on the terminal voltage of the abnormal system.

The abnormality determination part 45 specifies the short-circuited location after a lapse of predetermined waiting time from cutting-off of the power supply from battery 5 to the first inverter 120 in the first system 101 that is the abnormal system. Hence, it is especially possible to prevent erroneous determination of the power fault abnormality.

The abnormality determination part 45 specifies the short-circuited location when the motor 80 is in a constantly rotating state. When the motor 80 is not in the constantly rotating state, the capacitor voltages Vc1, Vc2 might not be stable. Therefore, in the present embodiment, when the motor 80 is in the constantly rotating state, it is considered that the determinable condition is satisfied, and the short-circuited location is then specified. Hence, it is possible to appropriately specify the short-circuited phase and the short-circuited state.

When a plurality of phases are specified as short-circuited phases in the abnormal system, correction of the command value in accordance with torque, generated by a current flowing in the short-circuited phases, is prohibited. When the plurality of phases are specified as the short-circuited phases, the short circuit might not be caused by the power fault abnormality or the ground fault abnormality, but be caused by abnormality in another location. Accordingly, prohibiting the correction of the command value prevents an increase in torque ripple due to the correction.

The electric power steering device 8 includes the motor control device 1 and the motor 80 that outputs assistance torque for assisting steering by the driver.

Since the motor 80 and the motor control device 1 of the present embodiment are made up of a plurality of systems, even when abnormality occurs in one system, it is possible to continue the drive of the motor 80 by the single-system drive using the normal system, and thereby to continue the assist of the steering. Further, the command value of the normal system is corrected in accordance with the short-circuited location, thereby enabling reduction in torque ripple of the motor 80. Hence, it is possible to suppress vibration and noise generated in the steering system 90 when the drive of the motor 80 is continued using the normal system.

Although the case where the first system 101 is the abnormal system has been mainly described, a similar effect is exerted when the second system 201 is the abnormal system.

Second Embodiment

A second embodiment of the present disclosure will be described based on FIGS. 12 to 15.

Figure 12:
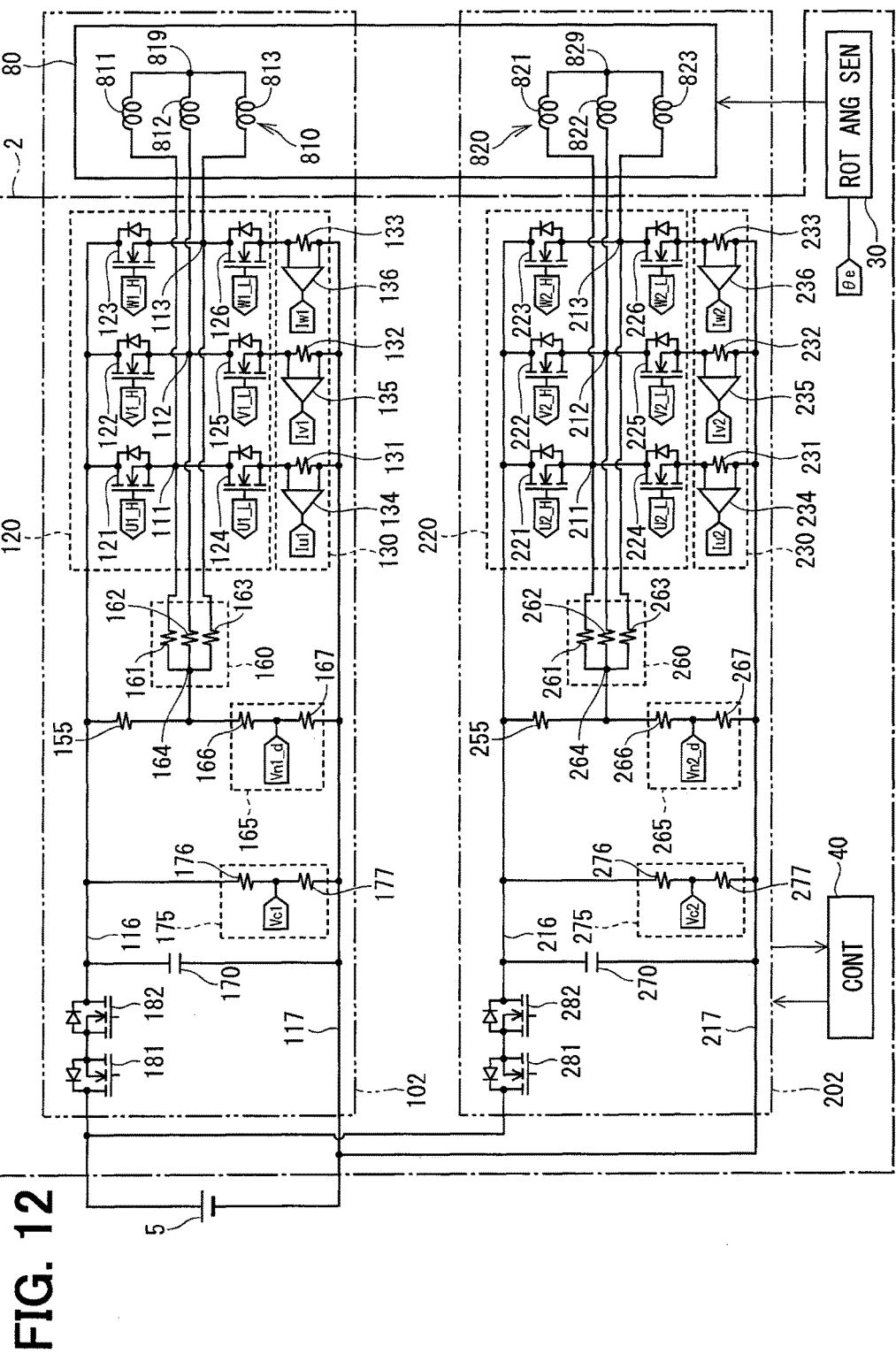
FIG. 12 is a circuit diagram for explaining a motor control device according to a second embodiment of the present disclosure.

As shown in FIG. 12, a motor control device 2 being a rotary electric machine control device of the present embodiment includes: the inverters 120, 220, pseudo neutral point generation parts 160, 260, pseudo neutral point voltage detection parts 165, 265, the capacitors 170, 270, the capacitor voltage detection part 175, 275, the power source relay part 180, 280, the rotation angle sensor 30, the control part 40, and the like. That is, the present embodiment is different from the above embodiment in that the pseudo neutral point generation parts 160, 260 and the pseudo neutral point voltage detection parts 165, 265 are provided in place of the terminal voltage detection parts 140, 240.

In the present embodiment, a first system 102 is made up of the first winding set 810 and the electronic components provided corresponding to the first winding set 810, such as the first inverter 120, and a second system 202 is made up of the electronic components provided corresponding to the second winding set 820, such as the second inverter 220.

Hereinafter, similarly to the first embodiment, a description will be mainly given of the configuration in accordance with the first system 102.

The pseudo neutral point generation part 160 includes resistors 161, 162, 163. One end of the resistor 161 is connected to the U1 terminal 111, one end of the resistor 162 is connected to the V1 terminal 112, and one end of the resistor 163 is connected to the W1 terminal 113. The other ends of the resistors 161, 162, 163 are connected by a connecting part 164. The connecting part 164 is taken as a pseudo neutral point. The connecting part 164 is connected to the first positive-side bus 116 through a pull-up resistor 155.

The first pseudo neutral point voltage detection part 165 includes resistors 166, 167 being partial resistors, and connected to the connecting part 164 and the first negative-side bus 117. A voltage of a connection point of the resistors 166, 167 is outputted to the control part 40 as a first pseudo neutral point voltage detection value $Vn1\_d$ that is a detection value in accordance with a first pseudo neutral point voltage $Vn1$.

A resistance value of each of the resistors 161 to 163 constituting the first pseudo neutral point generation part 160, the pull-up resistor 155, and the resistors 166, 167 constituting the first pseudo neutral point voltage detection part 165 can be set as appropriate. In the present embodiment, the resistance values of the resistors 155, 161 to 163, 166 are the same, and a resistance ratio between the resistance value of each of the resistors 155, 161 to 163, 166 and that of the resistor 167 is 3:2.

The control part 40 converts the first pseudo neutral point voltage detection value $Vn1\_d$ based on the resistance ratio of the resistors 166, 167, to calculate the first pseudo neutral point voltage $Vn1$.

That is, the pseudo neutral point voltage $Vn1$ is expressed by Formula (4-1). Further, a second pseudo neutral point voltage $Vn2$ is expressed by Formula (4-2).

$$Vn1 = Vn1\_d \times \{(3+2)/2\} \qquad (4\text{-}1)$$

$$Vn2 = Vn2\_d \times \{(3+2)/2\} \qquad (4\text{-}2)$$

In abnormal location specifying processing of the present embodiment, the pseudo neutral point voltages $Vn1, Vn2$ are used in place of the terminal voltage average values $Vt1, Vt2$. The other respects are similar to those in the above embodiment.

Figure 13:
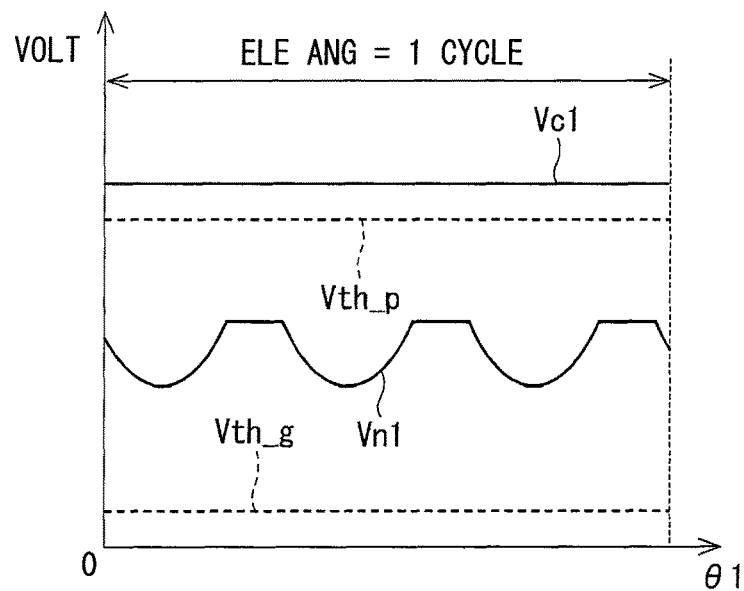
FIG. 13 is an explanatory view for explaining a pseudo neutral point voltage at the time of single-system drive when short-circuit abnormality has not occurred in the second embodiment of the present disclosure.
Figure 14:
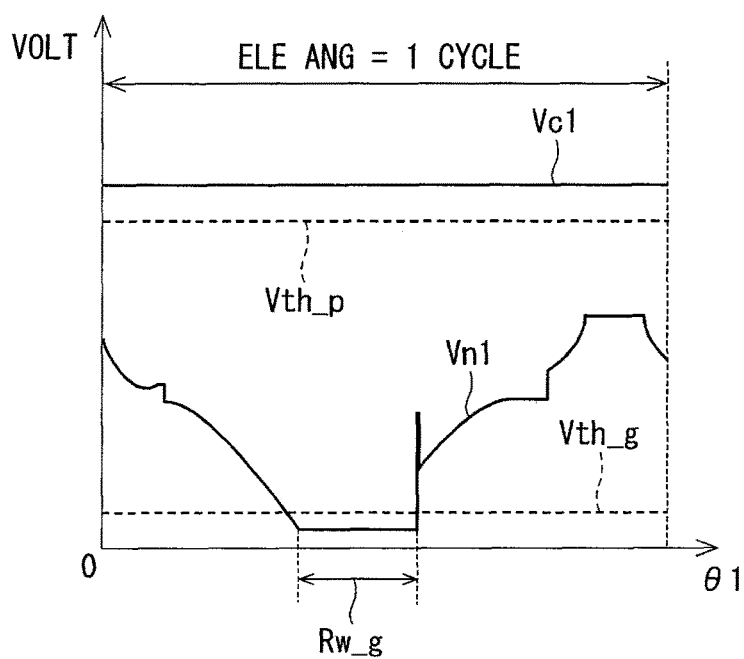
FIG. 14 is an explanatory view for explaining a pseudo neutral point voltage at the time of single-system drive when W-phase ground fault abnormality has occurred in the second embodiment of the present disclosure.
Figure 15:
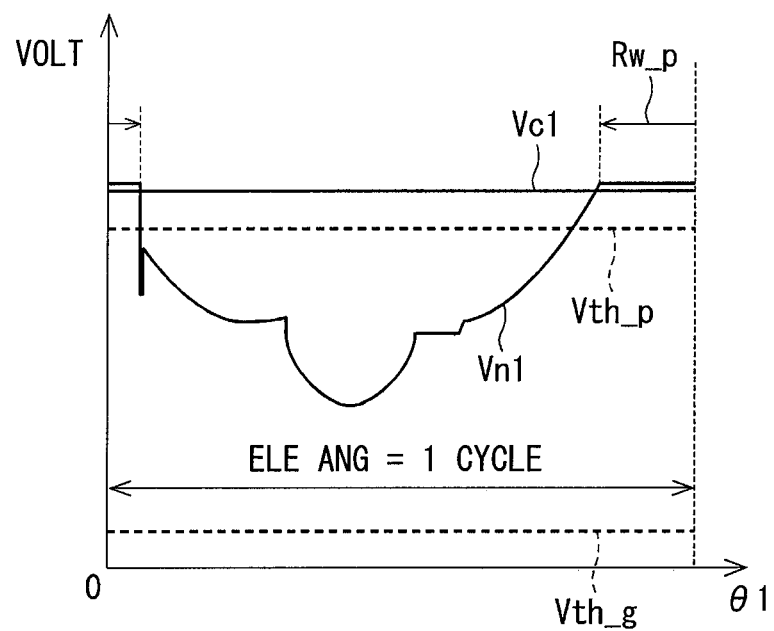
FIG. 15 is an explanatory view for explaining a pseudo neutral point voltage at the time of single-system drive when W-phase power fault abnormality has occurred in the second embodiment of the present disclosure.

FIGS. 13 to 15 show simulation results in a case where the abnormality occurs in the first system 102 and the motor 80 is positively rotated using the second system 202.

FIG. 13 is an example of the case where abnormality other than the short-circuit abnormality (e.g., open failure) has occurred in the first system 102. When the abnormality having occurred in the first system 102 is other than the short-circuit abnormality, the drive signals U1_H, U1_L, V1_H, V1_L, W1_H, W1_L are set to the off-commands so that a current by counter electromotive force, generated by the rotation of the motor 80, does not flow on the first inverter 120 side. Accordingly, as shown in FIG. 13, the first pseudo neutral point voltage $Vn1$ in a case where the short-circuit abnormality has not occurred in the first system 102 and the single-system drive is performed in the second system 202 does not depend on the first electric angle $\theta1$ and is in a range larger than the ground fault determination threshold $Vth\_g$ and smaller than power fault determination threshold $Vth\_p$.

Further, similarly to the above embodiment, when the abnormality in the first system 102 is other than the short-circuit abnormality and the single-system drive is performed in the second system 202, the torque compensation for compensating a corresponding amount of the torque ripple is not performed.

FIG. 14 is an example of the case where the W-phase ground fault abnormality has occurred in the first system 102. As shown in FIG. 14, when the W-phase ground fault abnormality has occurred in the first system 102, the pseudo neutral point voltage $Vn1$ is not larger than the ground fault determination threshold $Vth\_g$ in an angle range $Rw\_g$ including $120 \le \theta1 \le 180$ which is the W-phase ground fault determination range. Further, the first pseudo neutral point voltage $Vn1$ of each of the U-phase and V-phase ground fault determination ranges is larger than the ground fault determination threshold $Vth\_g$. Hence, it is possible to appropriately specify a phase where the ground fault abnormality has occurred.

FIG. 15 is an example of the case where the W-phase power fault abnormality has occurred in the first system 102. As shown in FIG. 15, when the W-phase power fault abnormality has occurred in the first system 102, the pseudo neutral point voltage Vn1 is not smaller than the power fault determination threshold Vth_p in an angle range Rw_g including 300≤θ1≤360 which is the W-phase ground fault determination range. Further, the first pseudo neutral point voltage Vn1 of each of the U-phase and V-phase power fault determination ranges is smaller than the power fault determination threshold Vth_p. Hence, it is possible to appropriately specify a phase where the power fault abnormality has occurred.

While the example where the W-phase has a power fault or a ground fault has been shown here, descriptions of the power faults and the ground faults of the U-phase and the V-phase are omitted since they are similar to the power fault and the ground fault of the W-phase except for the difference in phase. Further, when abnormality occurs in the second system 202, the second electric angle θ2 is used in place of the first electric angle θ1, and the second pseudo neutral point voltage Vn2 is used in place of the first pseudo neutral point voltage Vn1, whereby it is possible to appropriately specify a phase where the ground fault abnormality or the power fault abnormality has occurred in a similar manner to the above.

The motor control device 2 further includes the pseudo neutral point generation parts 160, 260 provided for the respective winding sets 810, 820.

The first pseudo neutral point generation part 160 is a resistor group having one end connected to the terminals 111 to 113 of the coils 811 to 813 for the respective phases, and the other end connected by the connecting part 164. The second pseudo neutral point generation part 260 is a resistor group having one end connected to the terminals 211 to 213 of the coils 821 to 823 for the respective phases, and the other end connected by a connecting part 264.

The pseudo neutral point voltage detection parts 165, 265 detect as the terminal voltages the pseudo neutral point voltages Vn1, Vn2 being voltages of the connecting parts 164, 264. That is, in the present embodiment, the pseudo neutral point voltage detection parts 165, 265 correspond to the "terminal voltage detection parts".

Even with such a configuration formed, a similar effect to that of the above embodiment is exerted. Further, the number of resistors can be reduced as compared with the case of providing the terminal voltage detection part for each phase.

Other Embodiments (I) Command Value

In the above embodiment, in the above embodiment, the command value corrected in accordance with the short-circuited location is the q-axis current command value. In another embodiment, for example, a command value other than the q-axis current command value, such as a torque command value, may be corrected in accordance with the short-circuited location.

(II) Current Detection Part

In the above embodiments, the current detection element is the shunt resistor, and is provided on the low potential side of the lower arm element. In another embodiment, the current detection element is not restricted to the shunt resistor, but it may be a Hall integrated circuit (IC) or the like, for example. Further, in another embodiment, the current detection element may be provided in a location other than the low potential side of the low potential-side SW element, such as the high potential side of the upper arm element, or a location between the winding set and the inverter part.

(III) Rotary Electric Machine

In the above embodiments, two winding sets are provided, and corresponding to these, two inverter parts and the like are provided. In another embodiment, the number of winding sets and the number of inverters provided corresponding to the winding sets may be three or larger. In this case, for example when the first system is abnormal, the command value may be corrected such that torque ripple is compensated by the remaining two systems.

Further, in the above embodiments, the first winding set and the second winding set are arranged with each of the phases thereof shifted by 30 [deg]. In another embodiment, any arrangement of the winding may be employed. Further, the ground fault determination range and the power fault abnormality range of each phase are set in accordance with arrangement of the winding and the definition of the electric angle.

In the above embodiments, the rotary electric machine is the three-phase blushless motor. In another embodiment, the number of phases of the rotary electric machine is not restricted to three, but may be four or larger. Further, the rotary electric machine is not restricted to the blushless motor, but may be any motor. Moreover, the rotary electric machine is not restricted to the motor, but may be a generator, or a so-called motor generator which has a combined function of the motor and the generator.

In the above embodiments, the rotary electric machine is applied to the electric power steering device. In another embodiment, the rotary electric machine control device may be applied to a device other than the electric power steering device.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A rotary electric machine control device for controlling a rotary electric machine that has a plurality of winding sets, each of which includes a plurality of coils corresponding to a plurality of phases, respectively, the rotary electric machine control device comprising:
an inverter that is arranged for each winding set and converts power of the rotary electric machine;
a power source relay that is arranged for each inverter and cuts off power supply from a power source to the inverter;
a terminal voltage detector that detects a terminal voltage of each coil; and
a controller that includes an inverter controller for controlling each inverter, a relay controller for controlling each power source relay, and an abnormality determination unit for determining abnormality of each inverter and each winding set, wherein:

a combination of each winding set and a corresponding inverter is defined as a system;
one of the systems where abnormality occurs is defined as an abnormal system;
another one of the systems that is normal is defined as a normal system;
when the rotary electric machine is driven using the normal system: the relay controller controls the power source relay so as to cut off power supply from the power source to the inverter in the abnormal system; the abnormality determination unit specifies a short-circuited location comprising a short-circuited phase of the plurality of phases based on the terminal voltage in the abnormal system; and the inverter controller corrects a command value related to control of the inverter in the normal system according to a specified the short-circuited location; and
the short-circuited phase comprises a phase where a power fault abnormality or a ground fault abnormality occurs, wherein:
the abnormality determination unit specifies the short-circuited location after a predetermined waiting time has elapsed from cutting-off of power supply from the power source to the inverter in the abnormal system, and
the abnormality determination unit specifies the short-circuited location when the rotary electric machine is in a constantly rotating state.

2. The rotary electric machine control device according to claim 1, further comprising:
a pseudo neutral point generator that is arranged for each winding set and provides a resistor group having one end connected to a terminal of each coil and another end connected by a connecting part, wherein:
the terminal voltage detector detects, as the terminal voltage, a pseudo neutral point voltage which is a voltage of the connecting part.

3. The rotary electric machine control device according to claim 1, wherein:
the terminal voltage detector detects the terminal voltage for each phase; and
the abnormality determination unit specifies the short-circuited location based on an average value of the terminal voltage of each phase in the abnormal system.

4. The rotary electric machine control device according to claim 1, wherein:
correction of the command value according to the short-circuited location is prohibited when a plurality of phases are specified as being short-circuited in the abnormal system.

5. An electric power steering device comprising:
the rotary electric machine control device according to claim 1; and
the rotary electric machine that outputs auxiliary torque for assisting a steering operation of a driver.

6. The rotary electric machine control device according to claim 1, wherein:
the abnormality determination unit specifies the short-circuited location based on an electric angle in addition to the terminal voltage.

7. A rotary electric machine control device for controlling a rotary electric machine that has a plurality of winding sets, each of which includes a plurality of coils corresponding to a plurality of phases, respectively,
the rotary electric machine control device comprising:
an inverter that is arranged for each winding set comprising a plurality of coils corresponding to a plurality of phases and converts power of the rotary electric machine;
a power source relay that is arranged for each inverter and cuts off power supply from a power source to the inverter;
a terminal voltage detector comprising a plurality of terminal voltage detection parts, one of the terminal voltage detection parts detects a terminal voltage of each of the plurality of coils; and
a controller that includes an inverter controller for controlling each inverter, a relay controller for controlling each power source relay, and an abnormality determination unit for determining abnormality of each inverter and each winding set, wherein:
a combination of each winding set and a corresponding inverter is defined as a system;
one of the systems where abnormality occurs is defined as an abnormal system;
another one of the systems that is normal is defined as a normal system;
when the rotary electric machine is driven using the normal system: the relay controller controls the power source relay so as to cut off power supply from the power source to the inverter in the abnormal system; the abnormality determination unit specifies a short-circuited location comprising a short-circuited phase of the plurality of phases based on the terminal voltage in the abnormal system; and the inverter controller corrects a command value related to control of the inverter in the normal system according to the short-circuited location; and
the short-circuited phase comprises a phase where a power fault abnormality or a ground fault abnormality occurs, wherein:
the abnormality determination unit specifies the short-circuited location after a predetermined waiting time has elapsed from cutting-off of power supply from the power source to the inverter in the abnormal system, and
the abnormality determination unit specifies the short-circuited location when the rotary electric machine is in a constantly rotating state.

8. A rotary electric machine control device for controlling a rotary electric machine that has a plurality of winding sets, each of which includes a plurality of coils corresponding to a plurality of phases, respectively,
the rotary electric machine control device comprising:
an inverter that is arranged for each winding set and converts power of the rotary electric machine;
a power source relay that is arranged for each inverter and cuts off power supply from a power source to the inverter;
a terminal voltage detector that detects a terminal voltage of each coil; and
a controller that includes an inverter controller for controlling each inverter, a relay controller for controlling each power source relay, and an abnormality determination unit for determining abnormality of each inverter and each winding set, wherein:
a combination of each winding set and a corresponding inverter is defined as a system;
one of the systems where abnormality occurs is defined as an abnormal system;
another one of the systems that is normal is defined as a normal system;
when the rotary electric machine is driven using the normal system, the relay controller controls the power source relay so as to cut off power supply from the power source to the inverter in the abnormal system;

the abnormality determination unit specifies a short-circuited location comprising a short-circuited phase of the plurality of phases based on the terminal voltage in the abnormal system; and the inverter controller corrects a command value related to control of the inverter in the normal system according to a specified the short-circuited location; and the short-circuited phase comprises a phase where a power fault abnormality or a ground fault abnormality occurs, wherein:

the abnormality determination unit specifies the short-circuited location after a predetermined waiting time has elapsed from cutting-off of power supply from the power source to the inverter in the abnormal system, and the abnormality determination unit specifies the short-circuited location based on an electric angle in addition to the terminal voltage.

\* \* \* \* \*